(12) United States Patent
McDermott et al.

(10) Patent No.: US 12,478,840 B2
(45) Date of Patent: Nov. 25, 2025

(54) GOLF BALLS HAVING CORE LAYERS WITH INDIVIDUAL HARDNESS GRADIENTS

(71) Applicant: Acushnet Company, Fairhaven, MA (US)

(72) Inventors: Erin McDermott, Providence, RI (US); Manjari Kuntimaddi, Raynham, MA (US); Dennis Britton, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 119 days.

(21) Appl. No.: 18/381,245

(22) Filed: Oct. 18, 2023

(65) Prior Publication Data

US 2025/0128126 A1    Apr. 24, 2025

(51) Int. Cl.
| | |
|---|---|
| *A63B 37/06* | (2006.01) |
| *A63B 37/00* | (2006.01) |
| *C08K 3/30* | (2006.01) |
| *C08K 5/14* | (2006.01) |
| *C08L 9/00* | (2006.01) |

(52) U.S. Cl.
CPC ...... *A63B 37/0063* (2013.01); *A63B 37/0051* (2013.01); *C08K 3/30* (2013.01); *C08K 5/14* (2013.01); *C08L 9/00* (2013.01); *C08K 2003/3045* (2013.01); *C08L 2205/025* (2013.01); *C08L 2205/03* (2013.01)

(58) Field of Classification Search
CPC ............ A63B 37/0063; A63B 37/005
See application file for complete search history.

(56) References Cited

U.S. PATENT DOCUMENTS

| | | | |
|---|---|---|---|
| 10,882,979 B2 | 1/2021 | Yamanaka et al. | |
| 11,040,251 B2 | 6/2021 | Yamanaka et al. | |
| 2003/0130063 A1 | 7/2003 | Voorheis et al. | |
| 2010/0323819 A1* | 12/2010 | Comeau | A63B 37/06 |
| | | | 473/376 |
| 2019/0217161 A1 | 7/2019 | Watanabe et al. | |
| 2020/0001142 A1* | 1/2020 | Yamanaka | A63B 37/00776 |
| 2024/0199861 A1* | 6/2024 | Shindo | C08K 5/09 |

FOREIGN PATENT DOCUMENTS

JP    2015-047502    3/2015

OTHER PUBLICATIONS

Dalton, Jeff, "Compression by Any Other Name", Science and Golf IV, Proceedings of the World Scientific Congress of Golf (Eric Thain ed., Routledge, 2002), pp. 319-327.

* cited by examiner

*Primary Examiner* — Raeann Gorden
(74) *Attorney, Agent, or Firm* — Bradley Arant Boult Cummings LLP

(57) ABSTRACT

Golf balls having core layers with individual hardness gradients are provided. The cores have at least one layer with an increased "positive" hardness gradient (or a "hard-to-soft" hardness) where the outer surface of the core is harder than the center. The increased positive hardness gradient can be achieved by introducing a water-releasing agent into the core rubber formulation during the curing process. The cores may also have a "zero" hardness gradient in another layer. By utilizing different hardness gradients in the core layers, the present disclosure allows for the properties of the final golf ball to be manipulated to produce desired performance characteristics.

17 Claims, 8 Drawing Sheets

GOLF BALLS HAVING CORE LAYERS WITH INDIVIDUAL HARDNESS GRADIENTS

FIELD OF THE INVENTION

The present disclosure relates generally to golf balls. More particularly, the present disclosure relates to golf balls having core layers with individual hardness gradients. In some respects, the present disclosure relates to golf balls having core layers with tailorable hardness gradients that, when used in golf balls, provide the ability to achieve one or more desired performance characteristics including, for example, spin rate and impact durability.

BACKGROUND OF THE INVENTION

Solid golf balls are typically made with a solid core encased by a cover, both of which can have multiple layers, such as a dual core having a solid center (or inner core) and an outer core layer, or a multi-layer cover having inner and outer cover layers. Generally, golf ball cores and/or centers are constructed with a thermoset rubber, such as a polybutadiene-based composition.

Thermoset rubbers are heated and crosslinked in a variety of processing steps to create a golf ball core having certain desirable characteristics, such as higher or lower compression or hardness, that can impact the spin rate of the ball and/or provide better "feel." These and other characteristics can be tailored to the needs of golfers of different abilities. For example, the resiliency and rebounding (Coefficient of Restitution) performance of the golf ball are generally driven by the composition and construction of the core. The spin rate and feel of the ball also are important properties that are affected by the composition and construction of the core. The spin rate refers to the rate of rotation of the golf ball after being hit with a club. Two factors that affect the spin rate of a golf ball are the hardness gradient of the core, i.e., the difference in hardness between the geometric center and outer surface of the core, and the compression of the core, i.e., how much the core deflects under a given load. Generally, golf balls having cores with an increased hardness gradient demonstrate overall lower spin rates. In contrast, golf balls having cores with no hardness gradient (or zero hardness gradient) generally demonstrate higher spin rates.

Most professionals and highly skilled amateurs (i.e., those who can control the spin of a golf ball) generally prefer balls with high spin rates to allow for better control in and around the green and draw and fade on approach shots. Indeed, these balls are beneficial for short distance shots made with irons and wedges. In contrast, recreational players who cannot necessarily control the spin of the ball will likely find that it is easier to play with a golf ball with low spin because the spin from a golf ball with a high spin rate can create more shot dispersion, i.e., more stray off to the left or right of the centerline, especially if the ball is hooked or sliced.

Meanwhile, the "feel" of the ball generally refers to the sensation that a player experiences when striking the ball with the club. Most players prefer balls having a soft feel, because the players experience a more natural and comfortable sensation when the club face makes contact with these balls. Balls having a softer feel are particularly desirable when making short shots around the green, because the player senses more with such balls. The feel of the ball primarily depends upon the hardness and compression of the ball.

Accordingly, there remains a need for golf ball cores having a hardness gradient that can be tailored to produce desired performance characteristics such as resiliency, rebounding, spin, and feel. In this aspect, it would be advantageous to tailor the core of a golf ball such that the finished golf ball has the desired amount of spin on short distance and driver shots for players having different levels of expertise as well as other advantageous properties, features, and benefits.

SUMMARY OF THE INVENTION

The problems expounded above, as well as others, are addressed by the following inventions, although it is to be understood that not every embodiment of the inventions described herein will address each of the problems described above.

In one embodiment, a golf ball is provided, the golf ball including a core having an outer surface and a geometric center, wherein the core is formed from a rubber composition cured under heat, the rubber composition including a base rubber, an organic peroxide, a cross-linking co-agent, at least two water releasing agents, the water releasing agents selected from the group consisting of calcium sulfate dihydrate, zinc sulfate heptahydrate, and aluminum sulfate hydrate, wherein the geometric center and the outer surface each has a hardness and the hardness of the geometric center ranges from about 45 Shore C to about 65 Shore C and the hardness of the outer surface ranges from about 80 Shore C to about 100 Shore C, and wherein the hardness of the outer surface is greater than the hardness of the geometric center to define a positive hardness gradient of at least 30 Shore C units; and a cover layer surrounding the core. In some embodiments, each water releasing agent is present in an amount of about 0.1 phr to about 3 phr. In further embodiments, the water releasing agents are calcium sulfate dihydrate and at least one of zinc sulfate heptahydrate or aluminum sulfate hydrate. In another embodiment, the water releasing agents are calcium sulfate dihydrate, zinc sulfate heptahydrate, and aluminum sulfate hydrate. In still another embodiment, each of the calcium sulfate dihydrate, zinc sulfate heptahydrate, and aluminum sulfate hydrate are present in an amount of about 1 phr. In yet another embodiment, the organic peroxide includes dimethyl terbutyl peroxide, dicumyl peroxide, or combinations thereof. In still further embodiments, the cross-linking co-agent includes a zinc salt of an acrylate, diacrylate, methacrylate, or dimethacrylate.

In another embodiment, a golf ball is provided, the golf ball including a dual core including a first core layer and a second core layer, wherein the first core layer is formed from a first rubber composition cured under heat, the first rubber composition including a base rubber, an organic peroxide, a cross-linking co-agent, and at least two water releasing agents, wherein each water releasing agent is a metal sulfate hydrate having one to seven waters of hydration, wherein the first core layer has an inner surface hardness less than an outer surface hardness to define a positive hardness gradient and the positive hardness gradient is at least 30 Shore C units, wherein the second core layer is formed from a second rubber composition cured under heat, the second rubber composition including a base rubber, an organic peroxide, and a cross-linking co-agent, wherein the second core layer has an inner surface hardness substantially the same as an outer surface hardness to define a zero hardness gradient, and a cover layer surrounding the dual core. In one embodiment, the first core layer is disposed over the second core layer. In another embodiment, the second core layer is disposed over the first core layer. In still another embodiment, the positive hardness gradient is at least 34 Shore C units. In yet another embodiment, each water releasing agent is present in an amount of about 0.1 phr to about 3 phr. In further embodiments, at least one of the first core layer or second core layer is cured under infrared radiation. In still further embodiments, the water releasing agents are selected from the group consisting of calcium sulfate dihydrate, zinc sulfate heptahydrate, and aluminum sulfate hydrate.

In still another embodiment, a golf ball is provided, the golf ball including a multi-layered core including a plurality of core layers, wherein at least one of the core layers is formed from a first rubber composition cured under heat and at least one other core layer is formed from a second rubber composition cured under heat, the first rubber composition including a base rubber, an organic peroxide, a cross-linking co-agent, and at least two water releasing agents, the water releasing agents selected from the group consisting of calcium sulfate dihydrate, zinc sulfate heptahydrate, and aluminum sulfate hydrate, wherein the core layer formed from the first rubber composition has an inner surface hardness less than an outer surface hardness to define a positive hardness gradient and the positive hardness gradient is at least 30 Shore C units, and the second rubber composition including a base rubber, an organic peroxide, and a cross-linking co-agent, wherein the core layer formed from the second rubber composition has an inner surface hardness substantially the same as an outer surface hardness to define a zero hardness gradient, and a cover layer surrounding the multi-layered core, wherein the cover layer comprises an ionomer, polyurethanes, polyureas, polyurethane-urea hybrids, or copolymers and blends thereof. In one embodiment, the core layer formed from the second rubber composition is an innermost layer of the core. In another embodiment, the core layer formed from the first rubber composition is an outermost or intermediate layer of the core. In still another embodiment, the water releasing agents are calcium sulfate dihydrate and at least one of zinc sulfate heptahydrate or aluminum sulfate hydrate. In yet another embodiment, the positive hardness gradient is at least 34 Shore C units. In another embodiment, the water releasing agents are calcium sulfate dihydrate, zinc sulfate heptahydrate, and aluminum sulfate hydrate.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
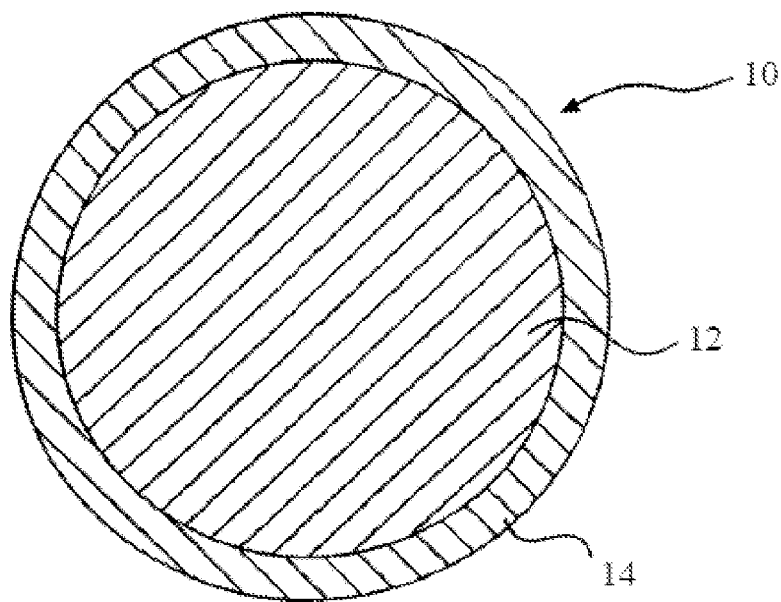
FIG. 1 is a cross-sectional view of a two-piece golf ball in accordance with an embodiment of the present disclosure.

The present disclosure provides golf balls having core layers with individual hardness gradients. For example, in some embodiments, the golf ball cores of the present disclosure may have a "positive" hardness gradient in one layer (where the outer surface of the layer is harder than the center) and a "zero" hardness gradient in another layer. By utilizing different hardness gradients in the core layers, the present disclosure allows for the properties of the final golf ball to be manipulated in order to produce desired performance characteristics such as the desired amount of spin on short distance and driver shots for players having different levels of expertise as well as other advantageous properties, features, and benefits.

Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

The term "positive hardness gradient" refers to the result of subtracting the hardness value at the innermost portion of the component being measured (for example, the center of a solid core or the center of an inner core in a dual core construction) from the hardness value at the outer surface of the component being measured (for example, the outer surface of a solid core or the outer surface of an inner core in a dual core). For instance, if the outer surface of a solid core has a greater hardness value than the center, the hardness gradient will be deemed a "positive" gradient.

The term "parts per hundred," also known as "phr," is defined as the number of parts by weight of a particular component present in a mixture, relative to 100 parts by weight of the base rubber component.

The term "zero hardness gradient" means the hardness value at the innermost portion of the component being measured (for example, the center of a solid core or the center of an inner core in a dual core construction) and the hardness value at the outer surface of the component being measured (for example, the outer surface of a solid core or the outer surface of an inner core in a dual core) are substantially the same.

Core Formulations

In some embodiments, the present disclosure provides golf balls having core formulations that result in increased "positive" hardness gradients. In this embodiment, the core formulations of the present disclosure include a base rubber, a cross-linking agent, a free radical initiator, and a water releasing agent that is capable of releasing water into the rubber formulation during the curing process. In further embodiments, the present disclosure provides golf balls having core formulations that result in "zero" hardness gradients. In this embodiment, the core formulations of the present disclosure include a base rubber, a cross-linking agent, and a free radical initiator. The core formulations may also optionally include additives, such as one or more of a metal oxide, metal fatty acid or fatty acid, antioxidant, soft and fast agent, or fillers.

Base Rubber

The core formulations of the present disclosure include a base rubber. In some embodiments, the base rubber may include natural and synthetic rubbers and combinations of two or more thereof. Examples of natural and synthetic rubbers suitable for use as the base rubber include, but are not limited to, polybutadiene, polyisoprene, ethylene propylene rubber (EPR), ethylene-propylene-diene (EPDM) rubber, grafted EPDM rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

In some embodiments, the core formulations may include polybutadiene rubber as the base rubber. The polybutadiene rubber can have various combinations of cis- and trans-bond structures. In one embodiment, the polybutadiene rubber has a 1,4 cis-bond content of at least 40 percent. In other embodiments, the polybutadiene rubber has a 1,4 cis-bond content of at least 80 percent. In still other embodiments, the polybutadiene rubber has a 1,4 cis-bond content of at least 90 percent. In general, polybutadiene rubbers having a high 1,4 cis-bond content have high tensile strength. The polybutadiene rubber may have a relatively high or low Mooney viscosity.

Examples of commercially-available polybutadiene rubbers that can be used in accordance with the present disclosure, include, but are not limited to, BR 01 and BR 1220, available from BST Elastomers of Bangkok, Thailand; SE BR 1220LA and SE BR1203, available from DOW Chemical Co. of Midland, Mich.; BUDENE 1207, 1207s, 1208, and 1280 available from Goodyear, Inc. of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. of Seoul, South Korea; DIENE 55NF, 70AC, and 320 AC, available from Firestone Polymers of Akron, Ohio; and combinations of two or more thereof.

The core formulations may include a single base rubber or a combination of two or more of the above-described rubbers as the base rubber. In some embodiments, the core formulations may include polybutadiene rubber, such as high cis-1,4 polybutadiene, as the base rubber. In this embodiment, the core formulation may include a combination of two or more types of polybutadiene rubber, such as two or more different types of high cis-1,4 polybutadiene. In some embodiments, the core formulations may include a combination of polybutadiene rubber and styrene-butadiene rubber (SBR) as the base rubber. For example, the core formulations may combine polybutadiene rubber and SBR with about 10 to 30 phr of SBR and about 70 to about 90 phr butadiene. In further embodiments, the core formulations may include EPDM rubber or grafted EPDM rubber as the base rubber. In still further embodiments, the core formulations may include a combination of polybutadiene rubber and EPDM rubber as the base rubber. For example, the core formulations may combine EPDM rubber and two or more different types of polybutadiene rubber, such as two or more different types of high cis-1,4 polybutadiene, as the base rubber.

In some embodiments, the core formulations include the base rubber in an amount of 100 phr. That is, when more than one rubber component is used in the core formulation as the base rubber, the sum of the amounts of each rubber component should total 100 phr. In some embodiments, the core formulations include polybutadiene rubber as the base rubber in an amount of 100 phr. In other embodiments, the core formulations include polybutadiene rubber and a second rubber component. In this embodiment, the polybutadiene rubber may be used in an amount of about 70 phr to about 99 phr and the second rubber component may be used in an amount of about 1 phr to about 30 phr. In still other embodiments, the polybutadiene rubber may be used in an amount of about 80 phr to about 95 phr and the second rubber component may be used in an amount of about 5 phr to about 20 phr. In some embodiments, the second rubber component is EPDM rubber. In other embodiments, the second rubber component is SBR rubber. In further embodiments, the second rubber component is neodymium catalyzed butadiene rubber.

The base rubber may be used in the core formulation in an amount of at least about 5 percent by weight based on the total weight of composition. In some embodiments, the base rubber may be used in an amount of about 20 percent to about 95 percent by weight. In further embodiments, the base rubber may be used in an amount of about 45 percent to about 95 percent by weight. In still other embodiments, the base rubber may be used in an amount of at least about 50 percent by weight. In yet further embodiments, the base rubber may be used in an amount of at least about 70 percent by weight.

Cross-Linking Agent

The core formulations include a reactive cross-linking co-agent. Suitable cross-linking co-agents include, but are not limited to, metal salts of unsaturated carboxylic acids having from 3 to 8 carbon atoms; unsaturated vinyl compounds and polyfunctional monomers (for example, trimethylolpropane trimethacrylate); phenylene bismaleimide; and combinations thereof. Examples of suitable metal salts include, but are not limited to, one or more metal salts of acrylates, diacrylates, methacrylates, and dimethacrylates, wherein the metal is selected from magnesium, calcium, zinc, aluminum, lithium, or nickel. In some embodiments, the cross-linking co-agent is selected from zinc salts of acrylates, diacrylates, methacrylates, or dimethacrylates. For example, in one embodiment, the cross-linking co-agent is zinc diacrylate (ZDA).

The cross-linking co-agent may be present in the core formulation in an amount of about 5 phr to about 50 phr. In some embodiments, the cross-linking co-agent may be present in the core formulation in an amount of about 10 phr to about 45 phr. In further embodiments, the cross-linking co-agent may be present in the core formulation in an amount of about 15 phr to about 40 phr. In still further embodiments, the cross-linking co-agent may be present in the core formulation in an amount of about 25 phr to about 40 phr. For example, in one embodiment, the cross-linking co-agent may be present in the core formulation in an amount of about 28 ph to about 32 phr. In another embodiment, the cross-linking co-agent may be present in the core formulation in an amount of about 30 phr to about 32 phr. In other embodiments, the cross-linking co-agent may be present in the core formulation in an amount of about 32 phr to about 37 phr. In yet other embodiments, the cross-linking co-agent may be present in the core formulation in an amount of about 33 phr to about 36 phr. In still other embodiments, the cross-linking co-agent may be present in the core formulation in an amount of about 15 phr to about 30 phr. In some embodiments, the core formulation may include about 20 phr to about 27 phr crosslinking co-agent.

Free Radical Initiator

The core formulations may include a free radical initiator selected from an organic peroxide, a high energy radiation source capable of generating free radicals, or a combination thereof. In some embodiments, the free radical initiator is an organic peroxide. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; dimethyl terbutyl peroxide blend; and combinations thereof. In one embodiment, the free radical initiator is dicumyl peroxide, including, but not limited to Perkadox® BC, commercially available from Akzo Nobel. In other embodiments, the free radical initiator is dimethyl terbutyl peroxide, including, but not limited to Trigonox® 101-50D-PD, commercially available from Nouryon.

The free radical initiator may be present in the core formulation in an amount of about 0.05 phr to about 15 phr. In some embodiments, the free radical initiator may be present in the core formulation in an amount of about 0.1 phr to about 10 phr. In other embodiments, the free radical initiator may be present in the core formulation in an amount of about 0.5 phr to about 6 phr. In still other embodiments, the free radical initiator may be present in the core formulation in an amount of about 1 phr to about 5 phr. In further embodiments, the free radical initiator may be present in the core formulation in an amount of about 1.5 phr to about 3 phr. In yet further embodiments, the free radical initiator is present in the core formulation in an amount of about 0.1 phr to about 2.5 phr. In still further embodiments, the free radical initiator is present in the core formulation in an amount of about 0.25 phr to about 1.5 phr. For example, the free radical initiator may be present in the core formulation in an amount of about 0.30 phr to about 0.40 phr. In other embodiments, the free radical initiator may be present in the core formulation in an amount of about 0.4 phr to about 0.8 phr. In further embodiments, the free radical initiator may be present in the core formulation in an amount of about 0.8 phr to about 1.0 phr. In still other embodiments, the free radical initiator may be present in the core formulation in an amount of about 0.9 phr to about 1.3 phr.

Water Releasing Agent

The core formulations of the present disclosure may include a water releasing agent. A "water releasing agent," as used herein, refers to a compound having at least one water molecule available for release during the curing process. Without being bound by any particular theory, the inventors of the present disclosure have discovered that an increased "positive" hardness gradient can be achieved by introducing a water-releasing agent into the core rubber formulation during the curing process. It is believed that the water released during the curing process promotes the decomposition of the free radical initiator, which further promotes radical deactivation and reduces the number of radicals at the center of the core. This, in turn, results in a difference in crosslinking density and leads to an increased hardness gradient between the surface and the center of the core layer. By increasing the hardness gradient from the outer surface of the core to the center, it is possible to reduce the spin rate of the golf ball and maintain sufficient durability.

The water releasing agent of the present disclosure has a moisture content capable of releasing a sufficient amount of water to promote decomposition of the free radical initiator and deactivation of radicals during the curing process. In some embodiments, the water releasing agent has a moisture content (in its molecular form) of at least about 5 percent by mass. In further embodiments, the water releasing agent has a moisture content ranging from about 5 percent by mass to about 95 percent by mass. In still further embodiments, the water releasing agent has a moisture content ranging from about 10 percent by mass to about 90 percent by mass. In yet further embodiments, the water releasing agent has a moisture content ranging from about 15 percent by mass to about 85 percent by mass. In further embodiments, the water releasing agent has a moisture content of at least about 50 percent by mass. For example, the water releasing agent has a moisture content of about 50 percent by mass to about 95 percent by mass.

In some embodiments, the water releasing agent of the present disclosure may be a metal sulfate hydrate having one or more waters of hydration capable of being released during the reactions of the present disclosure. In one embodiment, the metal may be an alkaline earth metal. For example, the metal may be calcium, magnesium, beryllium, strontium, barium, or radium. In one embodiment, the metal of the metal sulfate hydrate is calcium. In another embodiment, the metal of the metal sulfate hydrate is magnesium. In further embodiments, the metal may be a transition metal or a post-transition metal. For instance, the metal may be zinc, copper, iron, cobalt, manganese, chromium, nickel, aluminum, zirconium, cadmium, indium, or vanadium. In still further embodiments, the metal may be neodymium or lanthanum. In some embodiments, the metal of the metal sulfate hydrate is zinc. In further embodiments, the metal of the metal sulfate hydrate is aluminum.

The metal sulfate hydrate may have any number of waters of hydration. In some embodiments, the metal sulfate hydrate may have from 0.5 to ten waters of hydration. For instance, the metal sulfate hydrate may be a hemihydrate, monohydrate, dihydrate, trihydrate, tetrahydrate, pentahydrate, hexahydrate, heptahydrate, octahydrate, nonahydrate, or decahydrate. In further embodiments, the metal sulfate hydrate may have from one to seven waters of hydration. In still further embodiments, the metal sulfate hydrate may have from one to four waters of hydration. In yet further embodiments, the metal sulfate hydrate may have from one to three waters of hydration. In other embodiments, the metal sulfate hydrate may have two waters of hydration. For example, in one embodiment, the metal sulfate hydrate may be a dihydrate. In still further embodiments, the metal sulfate hydrate may be a heptahydrate (i.e., having seven waters of hydration). In further embodiments, the metal sulfate hydrate may be a monohydrate.

Examples of suitable metal sulfate hydrates contemplated for use as the water releasing agent in accordance with the present disclosure include, but are not limited to, calcium sulfate dihydrate ($CaSO_4 \cdot 2H_2O$), magnesium sulfate heptahydrate ($MgSO_4 \cdot 7H_2O$), zinc sulfate dihydrate ($ZnSO_4 \cdot 2H_2O$), zinc sulfate heptahydrate ($ZnSO_4 \cdot 7H_2O$), vanadium oxide sulfate hydrate ($VOSO_4 \cdot xH_2O$), neodymium sulfate hydrate ($Nd_2(SO_4)_3 \cdot xH_2O$), lanthanum oxalate hydrate ($La_2(C_2O_4)_3 \cdot xH_2O$), zinc sulfate monohydrate ($ZnSO_4 \cdot H_2O$), zirconium sulfate hydrate ($Zr(SO_4)_2 \cdot xH_2O$), nickel sulfate heptahydrate ($NiSO_4 \cdot 7H_2O$), nickel sulfate hexahydrate ($NiSO_4 \cdot 6H_2O$), aluminum sulfate hydrate ($Al_2(SO_4)_3 \cdot xH_2O$), and copper sulfate pentahydrate ($CuSO_4 \cdot 5H_2O$). The "x" in the formulae above refers to the number of waters of hydration. For example, a suitable aluminum sulfate hydrate may be aluminum sulfate trihydrate where x is 3 ($Al_2(SO_4)_3 \cdot 3H_2O$). In another embodiment, a suitable aluminum sulfate hydrate may be aluminum sulfate monohydrate where x is 1 ($Al_2(SO_4)_3 \cdot H_2O$).

The core formulations may include two or more of any of the water releasing agents described above. For example, the core formulations may include two or more of any of the metal sulfate hydrates described above. In some embodiments, the core formulations may include three or more of any of the metal sulfate hydrates described above. In one embodiment, the core formulations may include calcium sulfate dihydrate and zinc sulfate heptahydrate. In another embodiment, the core formulations may include calcium sulfate dihydrate and aluminum sulfate hydrate. In yet another embodiment, the core formulations may include zinc sulfate heptahydrate and aluminum sulfate hydrate. In still another embodiment, the core formulations may include calcium sulfate dihydrate, zinc sulfate heptahydrate, and aluminum sulfate hydrate.

In some embodiments, the water releasing agent is present in the core formulation in an amount of about 1 phr to about 10 phr. In still further embodiments, the water releasing agent is present in the core formulation in an amount of about 2 phr to about 8 phr. In yet further embodiments, the water releasing agent is present in the core formulation in an amount of about 3 phr to about 7 phr. In still further embodiments, the water releasing agent is present in the core formulation in an amount of about 2 phr to about 4 phr. In further embodiments, the water releasing agent is present in the core formulation in an amount of about 1 phr to about 3.9 phr. In still further embodiments, the water releasing agent is present in the core formulation in an amount of about 1 phr to about 3.75 phr. In yet further embodiments, the water releasing agent is present in the core formulation in an amount of about 1 phr to about 3 phr. For example, in some embodiments, the water releasing agent is present in the core formulation in an amount of about 2 phr to about 3 phr.

When more than one water releasing agent is present in the core formulation, the total amount of water releasing agent present may be about 0.2 phr to about 10 phr. In one embodiment, the total amount of water releasing agent may be at least about 3 phr. For example, when more than one water releasing agent is present in the core formulation, the total amount of water releasing agent may be about 1 phr to about 10 phr. In another embodiment, when more than one water releasing agent is present in the core formulation, the total amount of water releasing agent may be about 2 phr to about 8 phr. In still another embodiment, when more than one water releasing agent is present in the core formulation, the total amount of water releasing agent may be about 2 phr to about 6 phr. In yet another embodiment, when more than one water releasing agent is present in the core formulation, the total amount of water releasing agent may be about 1 phr to about 5 phr.

In some embodiments, when more than one water releasing agent is present in the core formulation, each water releasing agent may be present in an amount of about 0.1 phr to about 5 phr. In another embodiment, when more than one water releasing agent is present in the core formulation, each water releasing agent may be present in an amount of about 0.5 phr to about 4 phr. In another embodiment, each water releasing agent may be present in an amount of about 1 phr to about 3 phr. In still another embodiment, each water releasing agent may be present in an amount of about 1 phr to about 2 phr. In some embodiments, when two water releasing agents are present in the core formulation, the total amount of water releasing agents present may be about 2 phr to about 4 phr. For example, a first water releasing agent may be present in an amount of about 1 phr or 2 phr and a second water releasing agent may be present in an amount of about 1 phr or 2 phr. In another embodiment, the first water releasing agent may be present in an amount of about 1.5 phr to about 2 phr and the second water releasing agent may be present in an amount of about 1.5 phr to about 2 phr. In embodiments where three water releasing agents are present in the core formulation, the total amount of water releasing agents present may be about 2 phr to about 4.5 phr. For instance, each water releasing agent may be present in an amount of about 0.5 phr to about 1.5 phr. In further embodiments, a first water releasing agent may be present in an amount of about 1 phr to about 2 phr and a second and third water releasing agent may each be present in an amount of about 0.5 phr to about 1 phr.

Additives

Radical scavengers, such as a halogenated organosulfur or metal salt thereof, organic disulfide, or inorganic disulfide compound, may be added to the core formulations of the present disclosure. These compounds also may function as "soft and fast agents." As used herein, a "soft and fast agent" means any compound or a blend thereof that is capable of making a core: 1) softer (having a lower compression) at a constant "coefficient of restitution" (CoR); and/or 2) faster (having a higher COR at equal compression), when compared to a core equivalently prepared without a soft and fast agent. Examples of halogenated organosulfur compounds that may be used with the core formulations include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In some embodiments, the soft and fast agent is selected from ZnPCTP, PCTP, ditolyl disulfide, diphenyl disulfide, dixylyl disulfide, 2-nitroresorcinol, or combinations thereof. In some embodiments, the soft and fast agent may be used in the core formulation in an amount of about 0.1 phr to about 3 phr. In further embodiments, the soft and fast agent may be used in the core formulation in an amount of about 0.2 phr to about 1 phr. For example, the soft and fast agent may be used in the core formulation in an amount of about 0.3 phr to about 0.8 phr.

The core formulations of the present disclosure also may include "fillers," which are added to adjust the density and/or specific gravity of the formulation. Suitable fillers include, but are not limited to, polymeric or mineral fillers, metal fillers, metal alloy fillers, metal oxide fillers and carbonaceous fillers. The fillers can be in any suitable form including, but not limited to, flakes, fibers, whiskers, fibrils, plates, particles, and powders. Rubber regrind, which is ground, recycled rubber material obtained from discarded rubber golf ball cores, also can be used as a filler. The amount and type of fillers utilized are governed by the amount and weight of other ingredients in the golf ball, since a maximum golf ball weight of 45.93 g (1.62 ounces) has been established by the United States Golf Association (USGA).

Suitable polymeric or mineral fillers that may be added to the core formulations include, for example, precipitated hydrated silica, clay, talc, asbestos, glass fibers, aramid fibers, mica, calcium metasilicate, barium sulfate, zinc sulfide, lithopone, silicates, silicon carbide, tungsten carbide, diatomaceous earth, polyvinyl chloride, carbonates such as calcium carbonate and magnesium carbonate. Suitable metal fillers include titanium, tungsten, aluminum, bismuth, nickel, molybdenum, iron, lead, copper, boron, cobalt, beryllium, zinc, and tin. Suitable metal alloys include steel, brass, bronze, boron carbide whiskers, and tungsten carbide whiskers. Suitable metal oxide fillers include zinc oxide, iron oxide, aluminum oxide, titanium oxide, magnesium oxide, and zirconium oxide. Suitable particulate carbonaceous fillers include graphite, carbon black, cotton flock, natural bitumen, cellulose flock, and leather fiber. Micro balloon fillers such as glass and ceramic, and fly ash fillers can also be used. In some embodiments, the core formulations of the present disclosure include zinc oxide. The zinc oxide may be used in an amount ranging from about 1 phr to about 15 phr. In some embodiments, the zinc oxide may be used in an amount ranging from about 3 phr to about 10 phr, for example, about 5 phr. In further embodiments, the core formulations of the present disclosure include barium sulfate. The barium sulfate may be used in an amount ranging from about 10 phr to about 30 phr, for example, about 12 phr to about 18 or about 12 phr to about 14 phr.

The core formulations may also include antioxidants to prevent the breakdown of the elastomers. In addition, processing aids, such as high molecular weight organic acids and salts thereof, may be added to the formulations.

In some embodiments, the total amount of additive(s) and filler(s) present in the core formulation may be about 25 percent by weight or less, based on the total weight of the core formulation. In other embodiments, the total amount of additive(s) and filler(s) present in the core formulation may be about 22 percent by weight or less, based on the total weight of the core formulation. In still other embodiments, the total amount of additive(s) and filler(s) present in the core formulation may be about 20 percent by weight or less, based on the total weight of the core formulation. In further embodiments, the total amount of additive(s) and filler(s) present in the core formulation may be about 18 percent by weight or less, based on the total weight of the core formulation. In yet further embodiments, the total amount of additive(s) and filler(s) present in the core formulation may be about 15 percent by weight or less, based on the total weight of the core formulation.

Curing the Core Formulation

The base rubber, free radical initiator, cross-linking agent, water releasing agent, fillers, and any other materials used in forming the core, in accordance with the present disclosure, may be combined to form a mixture by any type of mixing known to one of ordinary skill in the art. Suitable types of mixing include single pass and multi-pass mixing, and the like. A single pass mixing process where ingredients are added sequentially is preferred, as this type of mixing tends to increase efficiency and reduce costs for the process.

The formulations may be cured using techniques known in the art for rubber compositions for golf balls. In one embodiment, the core formulations, for instance, the formulations that result in increased "positive" hardness gradients, may be cured at a temperature ranging from about 250° F. to about 390° F. In another embodiment, the core formulations may be cured at a temperature ranging from about 275° F. to about 375° F. In still another embodiment, the core formulations may be cured at a temperature ranging from about 280° F. to about 360° F. In some embodiments, the core formulations may have a cure time ranging from about 5 minutes to about 20 minutes. For example, the core formulations may have a cure time from about 7 minutes to about 15 minutes.

In another embodiment, the rubber compositions may be cured using infrared (IR) curing processes. IR curing processes use IR radiation to heat and cure the rubber composition to form a golf ball core. IR radiation is generally split into three wavelengths: short-wave, medium-wave, and long-wave. The wavelengths can vary from 0.7 microns to about 1000 microns. Generally, short-wave IR radiation is considered to be about 0.7 to about 1.5 microns, medium-wave IR radiation is considered to be about 1.5 to about 3 microns, and long-wave IR radiation is considered to be about 3 to about 1000 microns. There are a wide variety of IR heaters (i.e., emitters) for use in IR heating and curing that use different wavelengths of IR radiation. The type of emitter used to cure a golf ball core may affect the properties of the golf ball core. In some embodiments, the type of IR radiation employed in accordance with the present disclosure is a medium-wave or long-wave IR radiation wherein the heater is bright red during operation. IR heaters that output IR radiation in these ranges are well-known by those in the field and can be used to cure golf ball cores in accordance with the present disclosure.

The IR heater uses IR radiation to heat the surface and underlying mils of the golf ball core at temperatures ranging from less than 300° F. to up to 2000° F. The IR radiation heats the outer regions of the golf ball core to a higher temperature than the center of the core, thereby creating a temperature gradient within the core. The time of exposure and temperature of the IR heater determines the depth and degree of curing of the core.

Golf Ball Construction

Figure 2:
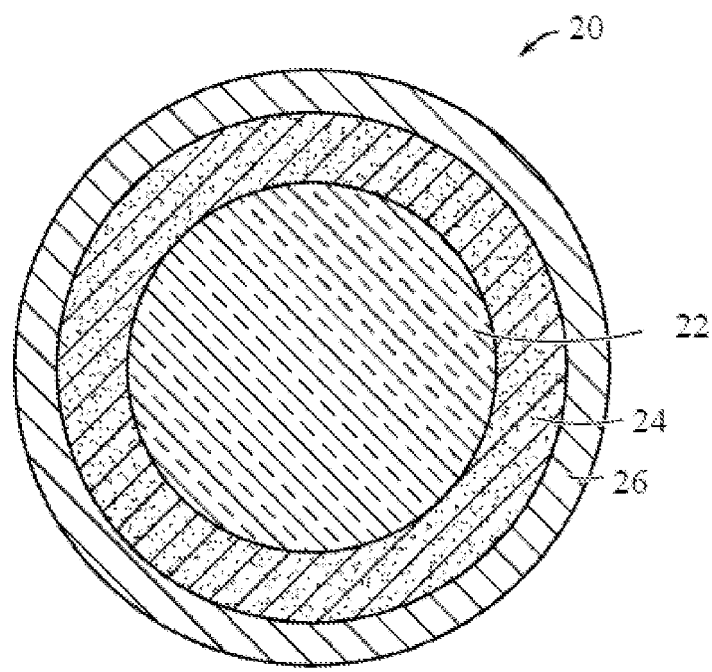
FIG. 2 is a cross-sectional view of a three-piece golf ball in accordance with an embodiment of the present disclosure.
Figure 3:
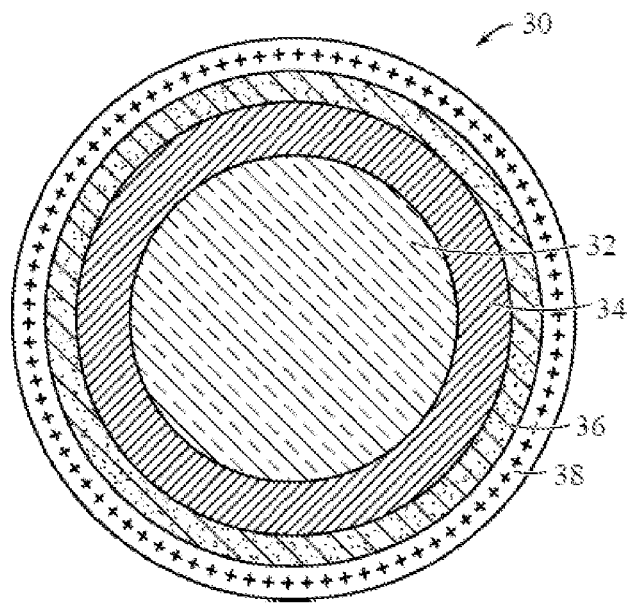
FIG. 3 is a cross-sectional view of a four-piece golf ball in accordance with an embodiment of the present disclosure.
Figure 4:
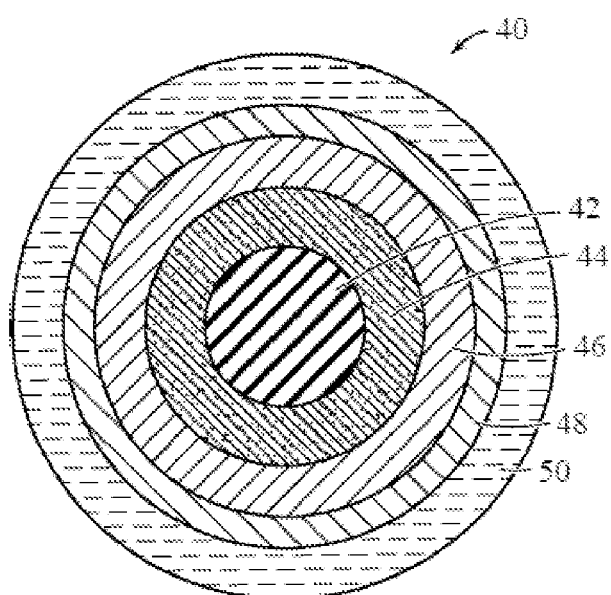
FIG. 4 is a cross-sectional view of a five-piece golf ball in accordance with an embodiment of the present disclosure.

The core formulations of the present disclosure may be used with golf balls of various constructions. In one version, shown in FIG. 1, a golf ball of the present disclosure is a two-piece ball 10 comprising a single core layer 12 and a single cover layer 14. As shown in FIG. 2, in one embodiment, the golf ball 20 comprises a core layer 22, an intermediate layer 24, and a cover layer 26. In FIG. 2, the intermediate layer 24 can be considered an outer core layer, an inner cover layer, a mantle or casing layer, or any other layer disposed between the core 22 and the cover layer 26. Referring to FIG. 3, in another embodiment, a four-piece golf ball 30 comprises an inner core layer 32, an outer core layer 34, an intermediate layer 36, and an outer cover layer 38. In FIG. 3, the intermediate layer 36 may be considered a casing or mantle layer, or inner cover layer, or any other layer disposed between the outer core layer 34 and the outer cover of the ball 38. Referring to FIG. 4, in another version, a five-piece golf ball 40 includes a three-layered core having an inner core layer 42, an intermediate core layer 44, an outer core layer 46, an inner cover layer 48, and an outer cover layer 50. As exemplified herein, a golf ball in accordance with the present disclosure can comprise any combination of any number of core layers, intermediate layers, and cover layers.

The core formulations of the present disclosure may be used with single- or multi-layered cores. The core formulations may be used in one or more layers of the core. In one embodiment, the core formulations described herein may be used in a solid core of a golf ball. In other embodiments, the core formulations described herein may be used in a dual core having an inner core (center) and a surrounding outer core layer. In one embodiment, the inner core layer (center) may be formed of the core formulation of the present disclosure while the outer core layer may be formed of a rubber composition. In another embodiment, the outer core layer may be formed of the core formulation while the inner core layer may be formed of a rubber composition. In other embodiments, both the inner core layer and the outer core layer may be formed of the core formulations of the present disclosure. In still other embodiments, the core formulations described herein may be used in a multi-layered core having three or more layers. For example, the center of the core may be formed of the core formulation of the present disclosure while the other layers of the core may be formed of a rubber composition. In still other embodiments, two or more layers of the core may be formed of the core formulations of the present disclosure.

In some embodiments, when the golf ball core is a dual core or a multi-layered core, the core layer(s) without the water releasing agent may be formed of a polybutadiene rubber composition. The rubber compositions may contain any of the base rubbers, free radical initiators, cross-linking agents, soft and fast agents, additives, and fillers described above, and the composition may be cured using conventional methods as described above. In some embodiments, the core layer(s) may include a combination of polybutadiene rubber and styrene butadiene rubber (SBR) as the base rubber. In this embodiment, the polybutadiene rubber may be used in an amount of about 80 phr to about 99 phr and the SBR may be used in an amount of about 1 phr to about 20 phr. For example, in some embodiments, the core layer(s) may be formed of a rubber composition including polybutadiene rubber, SBR, dicumyl peroxide, regrind, zinc pentachlorothiophenol, zinc diacrylate, and zinc oxide. In further embodiments, the core layer(s) may include a combination of polybutadiene rubber and neodymium catalyzed butadiene rubber as the base rubber. In this embodiment, the polybutadiene rubber may be used in an amount of about 80 phr to about 90 phr and the neodymium catalyzed butadiene rubber may be used in an amount of about 10 phr to about 20 phr.

In solid core embodiments, the core may have a diameter ranging from about 1.39 inches to about 1.62 inches. In some embodiments, the solid core may have a diameter of about 1.45 inches to about 1.60 inches. In still further embodiments, the solid core may have a diameter of about 1.50 inches to about 1.55 inches.

In dual core embodiments, the inner core (center) may have a diameter of about 0.25 inches to about 1.51 inches. In other embodiments, the inner core (center) may have a diameter of about 0.30 inches to about 1.45 inches. In still other embodiments, the inner core (center) may have a diameter of about 0.50 inches to about 1.30 inches. In further embodiments, the inner core (center) may have a diameter of about 0.75 inches to about 1.15 inches. In still further embodiments, the inner core (center) may have a diameter of about 0.90 inches to about 1.05 inches. For example, the inner core (center) may have a diameter of about 1.01 inches. The dual core, including the center and the outer core layer, may have a diameter of about 1.39 inches to about 1.62 inches. In some embodiments, the dual core has a diameter of about 1.45 inches to about 1.60 inches. In still further embodiments, the dual core has a diameter of about 1.50 inches to about 1.55 inches.

In some embodiments, one or more intermediate layers may be disposed between the single or multi-layered core and surrounding cover layer. These intermediate layers also can be referred to as casing or inner cover layers. The intermediate layer can be formed from any material known in the art, including thermoplastic and thermosetting materials. In some embodiments, the intermediate layer is formed of an ionomer composition including an ethylene acid copolymer containing acid groups that are at least partially neutralized. Suitable ethylene acid copolymers that may be used to form the intermediate layers are generally referred to as copolymers of ethylene; a C3 to C8 α,β-ethylenically unsaturated mono- or dicarboxylic acid; and an optional softening monomer.

A protective cover layer may be disposed over the core and any intermediate layers. The cover layers of the present disclosure provide the ball with a variety of advantageous mechanical properties such as, for example, high impact durability and high shear-resistance levels. The golf ball may contain one or more cover layers. For example, the golf ball may have a single-layered cover. In other embodiments, the golf ball may have a dual-layered cover including inner and outer cover layers. In still other embodiments, the golf ball may have a multi-layered cover including an inner cover layer, one or more intermediate cover layers, and an outer cover layer.

Suitable conventional materials that can be used to form a cover layer include, but are not limited to, polyurethanes; thermoplastic polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® TO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Polyurethanes, polyureas, and hybrids of polyurethanes-polyureas are particularly desirable because these materials can be used to make a golf ball having high resiliency and a soft feel. By the term, "hybrids of polyurethanes-polyureas," it is meant to include copolymers and blends thereof.

Suitable ionomer compositions for cover layers include, for example, partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a C3-C8 α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth)acrylate and alkyl (meth)acrylates wherein the alkyl groups have from 1 to 8 carbon atoms, including, but not limited to, n-butyl (meth)acrylate, isobutyl (meth) acrylate, methyl (meth) acrylate, and ethyl (meth) acrylate.

In some embodiments, the golf balls of the present disclosure may include a single-layered cover formed from an ionomeric composition, a thermoplastic polyurethane, or a castable polyurethane disposed over a solid core made from the core formulation described herein. In other embodiments, the golf balls of the present disclosure may include a dual-layered cover where the inner cover layer is formed from an ionomeric composition and the outer cover layer is formed from a thermoplastic polyurethane or a castable polyurethane disposed over a solid core made from the core formulation described herein.

In further embodiments, the golf balls of the present disclosure may include a single-layered cover formed from an ionomeric composition, a thermoplastic polyurethane, or a castable polyurethane disposed over a dual core or a multi-layered core where one or more core layers are made from the core formulations described herein. In still further embodiments, the golf balls of the present disclosure may include a dual-layered cover, where the inner cover layer is formed from an ionomeric composition and the outer cover layer is formed from a castable polyurethane, disposed over a dual core or a multi-layered core where one or more core layers are made from the core formulations described herein.

In some embodiments, the cover may be a single layer having a thickness of about 0.010 inches to about 0.040 inches. In other embodiments, the cover may be a single layer having a thickness of about 0.020 inches to about 0.035 inches. In still further embodiments, the cover may be a single layer having a thickness of about 0.025 inches to about 0.030 inches.

In further embodiments, the cover includes an inner cover layer and an outer cover layer. The inner cover layer may have a thickness ranging from about 0.010 inches to about 0.120 inches. In some embodiments, the inner cover layer may have a thickness ranging from about 0.015 inches to about 0.080 inches. In further embodiments, the inner cover layer may have a thickness ranging from about 0.020 inches to about 0.045 inches. The outer cover layer may have a thickness ranging from about 0.004 inches to about 0.080 inches. In other embodiments, the outer cover layer may have a thickness ranging from about 0.010 inches to about 0.055 inches. In still further embodiments, the outer cover layer may have a thickness ranging from about 0.020 inches to about 0.035 inches. In yet further embodiments, the outer cover layer may have a thickness of less than about 0.020 inches.

Golf Ball Properties

Golf balls having cores formed from the core formulations of the present disclosure have advantageous mechanical and playing performance properties. As briefly discussed above, the water releasing agent in the core formulation of the present disclosure serves as a promoter for further decomposition and deactivation of radicals at the center of the core during the curing process, which results in a difference in crosslinking density and an increased hardness gradient between the center and the surface of the core. The increased hardness gradient of the core can reduce the spin rate (or the rate of rotation) of the golf ball after it is hit by a club. The zero hardness gradient formulations, on the other hand, can be used to increase the spin rate of the golf ball. By forming a core with "positive" and "zero" hardness gradient layers, the spin rate of the final finished golf ball can be manipulated to produce desired performance characteristics.

Hardness of Core

One or more core layers of the golf balls of the present disclosure have a "positive" hardness gradient. That is, the outer surface of the layer has a greater hardness value than the center of the layer. The positive hardness gradient of the layer is defined by hardness measurements made at the outer surface of the layer and radially inward towards the center of the layer. These measurements are made typically at 2-mm increments as described in the test methods below.

In some embodiments, the core layer has a geometric center hardness of about 40 Shore C to about 70 Shore C. In other embodiments, the core layer has a geometric center hardness of about 45 Shore C to about 65 Shore C. In further embodiments, the core layer has a geometric center hardness of about 50 Shore C to about 60 Shore C. In still further embodiments, the core layer has a geometric center hardness of about 50 Shore C to about 55 Shore C. For example, in one embodiment, the core layer may have a geometric center hardness of about 55 Shore C.

In further embodiments, the core layer has an outer surface hardness of about 75 Shore C to about 105 Shore C. In some embodiments, the core layer has an outer surface hardness of about 80 Shore C to about 100 Shore C. In still further embodiments, the core layer has an outer surface hardness of about 85 Shore C to about 95 Shore C. In yet further embodiments, the core layer has an outer surface hardness of about 85 Shore C to about 90 Shore C. For instance, in one embodiment, the core layer may have an outer surface hardness of about 89 Shore C. In another embodiment, the core layer may have an outer surface hardness of about 91 Shore C.

The core layer of the present disclosure may have a positive hardness gradient of at least about 30 Shore C units. That is, the difference between the outer surface hardness and the geometric center hardness of the core layer may be at least about 30 Shore C units. In some embodiments, the core layer may have a positive hardness gradient of at least about 33 Shore C units. In still other embodiments, the core layer may have a positive hardness gradient of at least about 36 Shore C units. In further embodiments, the core layer may have a positive hardness gradient of at least about 40 Shore C units. For example, the positive hardness gradient of the core layer may range from about 30 Shore C units to about 50 Shore C units. In other embodiments, the positive hardness gradient of the core layer may range from about 30 Shore C units to about 40 Shore C units.

In embodiments where the golf ball includes a dual core, the inner core layer may have a positive hardness gradient. Alternatively, in embodiments where the golf ball includes a dual core, the outer core layer may have a positive hardness gradient. In further embodiments, the inner core and outer core layers may have a positive hardness gradient. In embodiments where the golf ball includes a multi-layered core, the innermost core layer may have a positive hardness gradient. In another embodiment, the outermost core layer may have a positive hardness gradient. In still another embodiment, one or more intermediate core layers may have a positive hardness gradient. In further embodiments, all core layers of the multi-layered core may have a positive hardness gradient as described herein.

In some embodiments, when one or more core layers have a "positive" hardness gradient, one or more other core layers may have a "zero" hardness gradient (that is, the hardness values of the outer surface of the core layer and the inner surface of the core layer are substantially the same). The term, "zero hardness gradient" as used herein means a hardness gradient of −2 Shore C to 2 Shore C, preferably between about −1 Shore C and about 1 Shore C and may have a value of zero. In dual core embodiments, the inner core layer may have a positive hardness gradient while the outer core layer may have a zero hardness gradient. Alternatively, the inner core layer may have a zero hardness gradient while the outer core layer may have a positive hardness gradient. In multi-layered core embodiments, the inner core layer may have a zero hardness gradient and the other layers of the core (e.g., the outer core layers) may have a zero or positive hardness gradient so long as at least one core layer has a positive hardness gradient. In another embodiment, an intermediate core layer may have a zero hardness gradient and the other layers of the core may have a zero or positive hardness gradient so long as at least one core layer has a positive hardness gradient. In still another embodiment, an outer core layer may have a zero hardness gradient and the other layers of the core (e.g., the inner core layers) may have a zero or positive hardness gradient so long as at least one core layer has a positive hardness gradient. In further embodiments, one or more core layers may have a "negative" hardness gradient, i.e., the outer surface of the layer is softer than the inner surface of the layer.

Core Component Relationships

In one embodiment, the amount of water releasing agent and the waters of hydration of the water releasing agent present in the rubber formulation used to form the core are related to the hardness gradient of the core, according to the relationship shown in Equation I below:

$$2 \le \frac{WRA_C * WRA_{WOH}}{1 - \frac{1}{H_{Gr}}} \le 15 \qquad (I)$$

where $WRA_C$ represents the concentration of water releasing agent in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \ge H_{Gr} \ge 50$; and $WRA_{WOH}$ represents the number of waters of hydration in the water releasing agent. For example, if the water releasing agent is calcium sulfate dihydrate, $WRA_{WOH}$ is equal to 2.

In another embodiment, the amount of water releasing agent and the waters of hydration of the water releasing agent present in the rubber formulation used to form the core are related to the hardness gradient of the core, according to the relationship shown in Equation II below:

$$2 \le \frac{WRA_C * WRA_{WOH}}{1 - \frac{1}{H_{Gr}}} \le 8 \qquad (II)$$

where $WRA_C$ represents the concentration of water releasing agent in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \ge H_{Gr} \ge 50$; and $WRA_{WOH}$ represents the number of waters of hydration in the water releasing agent.

In still another embodiment, the amount of water releasing agent and the waters of hydration of the water releasing agent present in the rubber formulation used to form the core are related to the hardness gradient of the core, according to the relationship shown in Equation II below:

$$4 \le \frac{WRA_C * WRA_{WOH}}{1 - \frac{1}{H_{Gr}}} \le 8 \qquad (III)$$

where $WRA_C$ represents the concentration of water releasing agent in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S$–$H_C$), and $30 \ge H_{Gr} \ge 50$; and $WRA_{WOH}$ represents the number of waters of hydration in the water releasing agent.

In yet another embodiment, the amount of water releasing agent and the waters of hydration of the water releasing agent present in the rubber formulation used to form the core are related to the hardness gradient of the core, according to the relationship shown in Equation IV below:

$$4 \leq \frac{WRA_C * WRA_{WOH}}{1 - \frac{1}{H_{Gr}}} \leq 6 \quad \text{(IV)}$$

where $WRA_C$ represents the concentration of water releasing agent in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$; and $WRA_{WOH}$ represents the number of waters of hydration in the water releasing agent.

In embodiments where more than one water releasing agent is present in the core, the total amount of water releasing agents and the total number of waters of hydration of all water releasing agents present in the rubber formulation are related to the hardness gradient of the core, according to the relationship shown in Equation V below:

$$1 \leq \frac{WRA_C * WRA_{WOH}}{1 - \frac{1}{H_{Gr}}} \leq 31 \quad \text{(V)}$$

where $WRA_C$ represents the total concentration of all water releasing agents in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$; and $WRA_{WOH}$ represents the total number of waters of hydration of all water releasing agents in the rubber formulation. For example, if the water releasing agents are calcium sulfate dihydrate, zinc sulfate heptahydrate, and aluminum sulfate hydrate, $WRA_{WOH}$ is equal to 10.

In further embodiments where more than one water releasing agent is present in the core, the total amount of water releasing agents and the total number of waters of hydration of all water releasing agents present in the rubber formulation are related to the hardness gradient of the core, according to the relationship shown in Equation VI below:

$$9 \leq \frac{WRA_C * WRA_{WOH}}{1 - \frac{1}{H_{Gr}}} \leq 31 \quad \text{(VI)}$$

where $WRA_C$ represents the total concentration of all water releasing agents in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$; and $WRA_{WOH}$ represents the total number of waters of hydration of all water releasing agents in the rubber formulation.

In still further embodiments where more than one water releasing agent is present in the core, the total amount of water releasing agents and the total number of waters of hydration of all water releasing agents present in the rubber formulation are related to the hardness gradient of the core, according to the relationship shown in Equation VII below:

$$4 \leq \frac{WRA_C * WRA_{WOH}}{1 - \frac{1}{H_{Gr}}} \leq 28 \quad \text{(VII)}$$

where $WRA_C$ represents the total concentration of all water releasing agents in the rubber formulation in parts per hundred; $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$; and $WRA_{WOH}$ represents the total number of waters of hydration of all water releasing agents in the rubber formulation.

In further embodiments, the number of waters of hydration of the water releasing agent present in the rubber formulation used to form the core is related to the hardness gradient of the core, according to the relationship shown in Equation VIII below:

$$\frac{WRA_{WOH}}{1 - \frac{1}{H_{Gr}}} \geq 60 \quad \text{(VIII)}$$

where $WRA_{WOH}$ represents the number of waters of hydration in the water releasing agent and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In still further embodiments, the number of waters of hydration of the water releasing agent present in the rubber formulation used to form the core is related to the hardness gradient of the core, according to the relationship shown in Equation IX below:

$$60 \leq \frac{WRA_{WOH}}{1 - \frac{1}{H_{Gr}}} < 200 \quad \text{(IX)}$$

where $WRA_{WOH}$ represents the number of waters of hydration in the water releasing agent and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In still further embodiments, the number of waters of hydration of the water releasing agent present in the rubber formulation used to form the core is related to the hardness gradient of the core, according to the relationship shown in Equation X below:

$$60 \leq \frac{WRA_{WOH}}{1 - \frac{1}{H_{Gr}}} < 150 \quad \text{(X)}$$

where $WRA_{WOH}$ represents the number of waters of hydration in the water releasing agent and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In embodiments where more than one water releasing agent is present in the core, the total number of waters of hydration of the water releasing agents present in the rubber formulation used to form the core is related to the hardness gradient of the core, according to the relationship shown in Equation XI below:

$$\frac{WRA_{WOH}}{1 - \frac{1}{H_{Gr}}} \geq 90 \quad \text{(XI)}$$

where $WRA_{WOH}$ represents the number of waters of hydration in the water releasing agent and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In still further embodiments where more than one water releasing agent is present in the core, the total number of waters of hydration of the water releasing agents present in the rubber formulation used to form the core is related to the hardness gradient of the core, according to the relationship shown in Equation XII below:

$$90 \leq \frac{WRA_{WOH}}{1 - \frac{1}{H_{Gr}}} < 500 \quad \text{(XII)}$$

where $WRA_{WOH}$ represents the number of waters of hydration in the water releasing agent and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

In yet further embodiments where more than one water releasing agent is present in the core, the total number of waters of hydration of the water releasing agents present in the rubber formulation used to form the core is related to the hardness gradient of the core, according to the relationship shown in Equation XIII below:

$$90 \leq \frac{WRA_{WOH}}{1 - \frac{1}{H_{Gr}}} < 250 \quad \text{(XIII)}$$

where $WRA_{WOH}$ represents the number of waters of hydration in the water releasing agent and $H_{Gr}$ represents the hardness gradient (Shore C) of the core or the difference between the hardness at the surface of the core ($H_S$) and the hardness at the geometric center of the core ($H_C$) ($H_S-H_C$), and $30 \geq H_{Gr} \geq 50$.

Compression

The cores of the golf balls of the present disclosure exhibit superior compression values. In some embodiments, the cores made from the formulations described herein have a compression of about 10 to about 95. In other embodiments, the cores made from the formulations described herein have a compression of about 30 to about 85. In still further embodiments, the cores made from the formulations described herein have a compression of about 45 to about 80. In further embodiments, the cores made from the formulations described herein have a compression of about 60 to about 80.

The finished golf balls of the present disclosure may have a compression ranging from about 70 to about 110. In other embodiments, the finished golf balls may have a compression ranging from about 75 to about 105. In still other embodiments, the finished golf balls may have a compression ranging from about 80 to about 100. In still further embodiments, the finished golf balls may have a compression ranging from about 85 to about 95.

Coefficient of Restitution (CoR)

The cores of the golf balls of the present disclosure also exhibit superior coefficient of restitution (CoR) values. In some embodiments, the overall CoR of the cores of the present disclosure at 125 ft/s is at least about 0.775. In other embodiments, the overall CoR of the cores of the present disclosure at 125 ft/s is at least about 0.780. In further embodiments, the overall CoR of the cores of the present disclosure at 125 ft/s is at least about 0.785. In still further embodiments, the overall CoR of the cores of the present disclosure at 125 ft/s is at least about 0.790. In other embodiments, the overall CoR of the cores of the present disclosure at 125 ft/s is at least about 0.795. In yet other embodiments, the overall CoR of the cores of the present disclosure at 125 ft/s is at least about 0.800.

The finished golf balls of the present disclosure may have an overall CoR of at least about 0.750. In other embodiments, the finished golf balls of the present disclosure may have an overall CoR of at least about 0.760. In still other embodiments, the finished golf balls of the present disclosure may have an overall CoR of at least about 0.770. In further embodiments, the finished golf balls have an overall CoR of at least about 0.780. In still further embodiments, the finished golf balls have an overall CoR of at least about 0.790. For example, the finished golf balls have an overall CoR of at least about 0.800. The superior compression and CoR properties allow players to generate greater ball velocity off the tee and achieve greater distance with their drives.

Spin Rate

As briefly discussed above, the increased hardness gradient of the cores of the present disclosure can reduce the spin rate (or the rate of rotation) of the golf ball after it is hit by a club. A lower spin rate after club impact contributes to straighter shots when the ball is mis-hit, greater efficiency in flight, and shots having longer distances. The golf balls of the present disclosure made with cores formulated with the water releasing agent described above exhibit lower spin rates when compared to golf balls formed with cores without a water releasing agent.

In some embodiments, the golf balls of the present disclosure have a driver spin rate of about 2900 revolutions per minute (rpm) or less at a ball speed of about 150 miles per hour (mph). For example, the golf balls of the present disclosure have a driver spin rate of about 2700 rpm to about 2900 rpm at a ball speed of about 150 mph. In further embodiments, the golf balls of the present disclosure have a driver spin rate of about 2800 rpm to about 2900 rpm at a ball speed of about 150 mph. In other embodiments, the golf balls of the present disclosure have a driver spin rate of about 2750 rpm or less at a ball speed of about 183 mph. For instance, the golf balls of the present disclosure have a driver spin rate of about 2500 rpm to about 2750 rpm at a ball speed of about 183 mph. In still further embodiments, the golf balls of the present disclosure have a driver spin rate of about 2600 rpm to about 2750 rpm at a ball speed of about 183 mph.

In further embodiments, the golf balls of the present disclosure have a spin rate of about 7900 rpm or less at a ball speed of about 120 mph when struck with a No. 8 iron. For example, the golf balls of the present disclosure have a spin rate of about 7500 rpm to about 7850 rpm at a ball speed of about 120 mph when struck with a No. 8 iron. In still further embodiments, the golf balls of the present disclosure have a spin rate of about 7600 rpm to about 7850 rpm at a ball speed of about 120 mph when struck with a No. 8 iron.

In still further embodiments, the golf balls of the present disclosure have a spin rate of about 5300 rpm or less at a ball speed of about 136 mph when struck with a No. 5 iron. For instance, the golf balls of the present disclosure have a spin rate of about 4900 rpm to about 5200 rpm at a ball speed of about 136 mph when struck with a No. 5 iron. In further embodiments, the golf balls of the present disclosure have a spin rate of about 5000 rpm to about 5200 rpm at a ball speed of about 136 mph when struck with a No. 5 iron.

In yet further embodiments, the golf balls of the present disclosure have a spin rate of about 7000 rpm or less at a ball speed of about 53 mph when struck with a half wedge. For example, the golf balls of the present disclosure have a spin rate of about 6700 rpm to about 7000 rpm at a ball speed of about 53 mph when struck with a half wedge. In still further embodiments, the golf balls of the present disclosure have a spin rate of about 6800 rpm to about 7000 rpm at a ball speed of about 53 mph when struck with a half wedge.

EXAMPLES

The following non-limiting examples demonstrate golf balls and golf ball cores that may be made in accordance with the present disclosure. The examples are merely illustrative of the preferred embodiments of the present disclosure and are not to be construed as limiting the disclosure, the scope of which is defined by the appended claims.

Examples 1-3: Dual Cores with Positive Hardness Gradient Layer & Zero Hardness Gradient Layer Table 1 below shows an exemplary core formulation for a dual core. As shown in Table 1, the water releasing agents, calcium sulfate dihydrate and zinc sulfate heptahydrate, are used in the core formulation for the outer core in an amount of 1 phr and 2 phr, respectively, to form a positive hardness gradient. The formulation of the inner core forms a zero hardness gradient.

TABLE 1

Core Formulation for Dual Core

| | Example 1 | |
| --- | --- | --- |
| | Inner Core Composition (phr) | Outer Core Composition (phr) |
| Base Rubber | | |
| High cis-1,4 polybutadiene (Buna CB 1221) | 100 | 100 |
| Styrene butadiene rubber (SBR 1502) | 0 | 0 |
| Cross-linking agent | | |
| Zinc diacrylate (ZDA) | 30.5 | 30.5 |
| Free radical initiator | | |
| Dicumyl peroxide (Perkadox ® BC) | 1 | 1 |
| Water releasing agent | | |
| Calcium sulfate dihydrate | 0 | 1 |
| Zinc sulfate heptahydrate | 0 | 2 |
| Soft and fast agent | | |
| Zinc pentachlorothiophenol (ZnPCTP) | 0.34 | 0.34 |
| Fillers | | |
| Zinc oxide (ZnO) | 5 | 5 |
| Regrind | 0 | 0 |
| Barium sulfate | 12.4 | 12.4 |

Table 2 below shows another exemplary core formulation for a dual core. As shown in Table 2, the water releasing agents, calcium sulfate dihydrate and aluminum sulfate hydrate, are used in the core formulation for the outer core in an amount of 2 phr and 1 phr, respectively, to form a positive hardness gradient. The formulation of the inner core forms a zero hardness gradient.

TABLE 2

Core Formulation for Dual Core

| | Example 2 | |
| --- | --- | --- |
| | Inner Core Composition (phr) | Outer Core Composition (phr) |
| Base Rubber | | |
| High cis-1,4 polybutadiene (Buna CB 1221) | 100 | 100 |
| Styrene butadiene rubber (SBR 1502) | 0 | 0 |
| Cross-linking agent | | |
| Zinc diacrylate (ZDA) | 30.5 | 30.5 |
| Free radical initiator | | |
| Dicumyl peroxide (Perkadox ® BC) | 1 | 1 |
| Water releasing agent | | |
| Calcium sulfate dihydrate | 0 | 2 |
| Aluminum sulfate hydrate | 0 | 1 |
| Soft and fast agent | | |
| Zinc pentachlorothiophenol (ZnPCTP) | 0.34 | 0.34 |
| Fillers | | |
| Zinc oxide (ZnO) | 5 | 5 |
| Regrind | 0 | 0 |
| Barium sulfate | 12.4 | 12.4 |

Table 3 below shows a further exemplary core formulation for a dual core. As shown in Table 3, the water releasing agents, calcium sulfate dihydrate, zinc sulfate heptahydrate, and aluminum sulfate hydrate, are used in the core formulation for the inner core in an amount of 1 phr each to form a positive hardness gradient. The formulation of the outer core forms a zero hardness gradient.

TABLE 3

Core Formulation for Dual Core

|  | Example 3 | |
|---|---|---|
|  | Inner Core Composition (phr) | Outer Core Composition (phr) |
| Base Rubber | | |
| High cis-1,4 polybutadiene (Buna CB 1221) | 100 | 100 |
| Styrene butadiene rubber (SBR 1502) | 0 | 0 |
| Cross-linking agent | | |
| Zinc diacrylate (ZDA) | 30.5 | 30.5 |
| Free radical initiator | | |
| Dicumyl peroxide (Perkadox ® BC) | 1 | 1 |
| Water releasing agent | | |
| Calcium sulfate dihydrate | 1 | 0 |
| Zinc sulfate heptahydrate | 1 | 0 |
| Aluminum sulfate hydrate | 1 | 0 |
| Soft and fast agent | | |
| Zinc pentachlorothiophenol (ZnPCTP) | 0.34 | 0.34 |
| Fillers | | |
| Zinc oxide (ZnO) | 5 | 5 |
| Regrind | 0 | 0 |
| Barium sulfate | 12.4 | 12.4 |

Example 4: Multi-Layered Core with Positive Hardness Gradient Layer & Zero Hardness Gradient Layer Table 4 below shows an exemplary core formulation for a multi-layered core. As shown in Table 4, the water releasing agents, calcium sulfate dihydrate, zinc sulfate heptahydrate, and aluminum sulfate hydrate, are used in the core formulation for the outermost core layer in an amount of 1 phr each and the water releasing agent, calcium sulfate dihydrate, is used in the core formulation for the intermediate core layer in an amount of 1 phr to form positive hardness gradients in each layer. The formulation of the inner core forms a zero hardness gradient.

TABLE 4

Core Formulation for Multi-Layered Core

|  | Example 4 | | |
|---|---|---|---|
|  | Inner Core Composition (phr) | Intermediate Core Composition (phr) | Outer Core Composition (phr) |
| Base Rubber | | | |
| High cis-1,4 polybutadiene (Buna CB 1221) | 0 | 100 | 100 |
| High cis-1,4 polybutadiene (BUDENE ® 1207) | 81 | 0 | 0 |
| Styrene butadiene rubber (SBR 1502) | 19 | 0 | 0 |
| Cross-linking agent | | | |
| Zinc diacrylate (ZDA) | 35.5 | 30.5 | 30.5 |
| Free radical initiator | | | |
| Dicumyl peroxide (Perkadox ® BC) | 0.35 | 1 | 1 |
| Water releasing agent | | | |
| Calcium sulfate dihydrate | 0 | 1 | 1 |
| Zinc sulfate heptahydrate | 0 | 0 | 1 |
| Aluminum sulfate hydrate | 0 | 0 | 1 |
| Soft and fast agent | | | |
| Zinc pentachlorothiophenol (ZnPCTP) | 0.71 | 0.34 | 0.34 |
| Fillers | | | |
| Zinc oxide (ZnO) | 14.8 | 5 | 5 |
| Regrind | 28 | 0 | 0 |
| Barium sulfate | 0 | 12.4 | 12.4 |

Examples 5-11: Solid Cores with Positive Hardness Gradient

Table 5 below shows an exemplary core formulation for a solid core. As shown in Table 5, the water releasing agents, calcium sulfate dihydrate and zinc sulfate heptahydrate, are used in the core formulation for the solid core in an amount of 1 phr and 2 phr, respectively, to form a positive hardness gradient in the core.

TABLE 5

Core Formulation for Solid Core

|  | Example 5 Core Composition (phr) |
|---|---|
| Base Rubber | |
| High cis-1,4 polybutadiene (Buna CB 1221) | 100 |
| High cis-1,4 polybutadiene (BUDENE ® 1207) | 0 |
| Cross-linking agent | |
| Zinc diacrylate (ZDA) | 30.5 |
| Free radical initiator | |
| Dicumyl peroxide (Perkadox ® BC) | 1 |
| Water releasing agent | |
| Zinc sulfate heptahydrate | 2 |
| Calcium sulfate dihydrate | 1 |
| Soft and fast agent | |
| Zinc pentachlorothiophenol (ZnPCTP) | 0.34 |
| Fillers | |
| Zinc oxide (ZnO) | 5 |
| Regrind | 0 |
| Barium sulfate | 12.4 |

Table 6 below shows another exemplary core formulation for a solid core. As shown in Table 6, the water releasing agents, calcium sulfate dihydrate and aluminum sulfate hydrate, are used in the core formulation for the solid core in an amount of 2 phr and 1 phr, respectively, to form a positive hardness gradient in the core.

TABLE 6

Core Formulation for Solid Core

| | Example 6 Core Composition (phr) |
|---|---|
| Base Rubber | |
| High cis-1,4 polybutadiene (Buna CB 1221) | 100 |
| High cis-1,4 polybutadiene (BUDENE ® 1207) | 0 |
| Cross-linking agent | |
| Zinc diacrylate (ZDA) | 30.5 |
| Free radical initiator | |
| Dicumyl peroxide (Perkadox ® BC) | 1 |
| Water releasing agent | |
| Calcium sulfate dihydrate | 2 |
| Aluminum sulfate hydrate | 1 |
| Soft and fast agent | |
| Zinc pentachlorothiophenol (ZnPCTP) | 0.34 |
| Fillers | |
| Zinc oxide (ZnO) | 5 |
| Regrind | 0 |
| Barium sulfate | 12.4 |

Table 7 below shows another exemplary core formulation for a solid core. As shown in Table 7, the water releasing agents, calcium sulfate dihydrate, zinc sulfate heptahydrate, and aluminum sulfate hydrate, are used in the core formulation for the solid core in an amount of 1 phr each to form a positive hardness gradient in the core.

TABLE 7

Core Formulation for Solid Core

| | Example 7 Core Composition (phr) |
|---|---|
| Base Rubber | |
| High cis-1,4 polybutadiene (Buna CB 1221) | 100 |
| High cis-1,4 polybutadiene (BUDENE ® 1207) | 0 |
| Cross-linking agent | |
| Zinc diacrylate (ZDA) | 30.5 |
| Free radical initiator | |
| Dicumyl peroxide (Perkadox ® BC) | 1 |
| Water releasing agent | |
| Calcium sulfate dihydrate | 1 |
| Zinc sulfate heptahydrate | 1 |
| Aluminum sulfate hydrate | 1 |
| Soft and fast agent | |
| Zinc pentachlorothiophenol (ZnPCTP) | 0.34 |
| Fillers | |
| Zinc oxide (ZnO) | 5 |
| Regrind | 0 |
| Barium sulfate | 12.4 |

Table 8A below shows an exemplary core formulation for a solid core. As shown in Table 8A, the water releasing agent, aluminum sulfate hydrate, was used in the core formulation in an amount of 2 phr to form a positive hardness gradient in the core.

TABLE 8A

Core Formulation for Solid Core

| | Example 8 Core Composition (phr) |
|---|---|
| Base Rubber | |
| High cis-1,4 polybutadiene (Buna CB 1221) | 100 |
| High cis-1,4 polybutadiene (BUDENE ® 1207) | 0 |
| Cross-linking agent | |
| Zinc diacrylate (ZDA) | 33.5 |
| Free radical initiator | |
| Dicumyl peroxide (Perkadox ® BC) | 0.75 |
| Water releasing agent | |
| Aluminum sulfate hydrate | 2 |
| Soft and fast agent | |
| Zinc pentachlorothiophenol (ZnPCTP) | 0.34 |
| Fillers | |
| Zinc oxide (ZnO) | 5 |
| Regrind | 0 |
| Barium sulfate | 12.06 |

The core formed in Example 8 was evaluated for compression, surface hardness, center hardness, coefficient of restitution (COR), and hardness gradient, according to the test methods described below. The core of Example 8 was also formed with an ionomer/thermoplastic casing and the same physical properties were tested. The results are shown in Table 8B.

TABLE 8B

Physical Properties

| | Dynamic Compression Measurement (DCM) | Surface Hardness (Shore C) | Center Hardness (Shore C) | COR | Hardness Gradient (Shore C) |
|---|---|---|---|---|---|
| Core | 71.3 | 89.5 | 55.6 | 0.790 | 34.0 |
| Core with casing | 91.7 | 95.4 | N/A | 0.815 | N/A |

Table 9A below shows an exemplary core formulation for a solid core. As shown in Table 9A, the water releasing agent, zinc sulfate heptahydrate, was used in the core formulation in an amount of 2 phr to form a positive hardness gradient in the core.

TABLE 9A

Core Formulation for Solid Core

| | Example 9 Core Composition (phr) |
|---|---|
| Base Rubber | |
| High cis-1,4 polybutadiene (Buna CB 1221) | 100 |

TABLE 9A-continued

Core Formulation for Solid Core

| | Example 9 Core Composition (phr) |
|---|---|
| High cis-1,4 polybutadiene (BUDENER 1207) | 0 |
| Cross-linking agent | |
| Zinc diacrylate (ZDA) | 33.5 |
| Free radical initiator | |
| Dicumyl peroxide (Perkadox ® BC) | 0.75 |
| Water releasing agent | |
| Zinc sulfate heptahydrate | 2 |
| Soft and fast agent | |
| Zinc pentachlorothiophenol (ZnPCTP) | 0.34 |
| Fillers | |
| Zinc oxide (ZnO) | 5 |
| Regrind | 0 |
| Barium sulfate | 11.02 |

The core formed in Example 9 was evaluated for compression, surface hardness, center hardness, coefficient of restitution (COR), and hardness gradient, according to the test methods described below. The core of Example 9 was also formed with an ionomer/thermoplastic casing and the same physical properties were tested. The results are shown in Table 9B.

TABLE 9B

Physical Properties

| | Dynamic Compression Measurement (DCM) | Surface Hardness (Shore C) | Center Hardness (Shore C) | COR | Hardness Gradient (Shore C) |
|---|---|---|---|---|---|
| Core | 70.2 | 88.3 | 55.5 | 0.793 | 33.0 |
| Core with casing | 91.2 | 95.3 | N/A | 0.817 | N/A |

Table 10A below shows exemplary core formulations for a solid core. As shown in Table 10A, the water releasing agent, calcium sulfate dihydrate, is used in the core formulations in an amount of 3 phr.

TABLE 10A

Core Formulations for Solid Core

| | Example 10 Core Composition (phr) | Example 11 Core Composition (phr) |
|---|---|---|
| Base Rubber | | |
| High cis-1,4 polybutadiene (Buna CB 1221) | 80 | 100 |
| EPDM (Dow Nordel ® IP 5565 EPDM) | 5 | 0 |
| High cis-1,4 polybutadiene (BUDENE ® 1207) | 15 | 0 |
| Cross-linking agent | | |
| Zinc diacrylate (ZDA) | 32 | 30.5 |
| Free radical initiator | | |
| Dicumyl peroxide (Perkadox ® BC) | 0.6 | 1 |

TABLE 10A-continued

Core Formulations for Solid Core

| | Example 10 Core Composition (phr) | Example 11 Core Composition (phr) |
|---|---|---|
| Water releasing agent | | |
| Calcium sulfate dihydrate | 3 | 3 |
| Soft and fast agent | | |
| Zinc pentachlorothiophenol (ZnPCTP) | 0.34 | 0.34 |
| Fillers | | |
| Zinc oxide (ZnO) | 5 | 5 |
| Regrind | 10 | 0 |
| Barium sulfate | 12.5 | 12.4 |

The cores formed in Examples 10 and 11 were evaluated for compression, surface hardness, center hardness, coefficient of restitution (COR), and hardness gradient, according to the test methods described below. The results are shown in Table 10B.

TABLE 10B

Physical Properties of Cores

| | Dynamic Compression Measurement (DCM) | Surface Hardness (Shore C) | Center Hardness (Shore C) | COR | Hardness Gradient (Shore C) |
|---|---|---|---|---|---|
| Example 10 | 73.7 | 89 | 54.4 | 0.79 | 34.6 |
| Example 11 | 75.1 | 91 | 57.2 | 0.794 | 33.8 |

Examples 12-13: Dual Cores with Positive Hardness Gradient

Table 11 below shows an exemplary core formulation for a dual core. As shown in Table 11, the water releasing agents, calcium sulfate dihydrate, zinc sulfate heptahydrate, and aluminum sulfate hydrate, were used in the core formulation for the inner core in an amount of 1 phr each to form a positive hardness gradient in the inner core layer.

TABLE 11

Core Formulation for Dual Core

| | Example 12 | |
|---|---|---|
| | Inner Core Composition (phr) | Outer Core Composition (phr) |
| Base Rubber | | |
| High cis-1,4 polybutadiene (Buna CB 1221) | 100 | 0 |
| Ethylene-propylene-diene rubber (Dow Nordel ® IP 5565 EPDM) | 0 | 0 |
| High cis-1,4 polybutadiene (BUDENE ® 1207) | 0 | 81 |
| Styrene butadiene rubber (SBR 1502) | 0 | 19 |
| Cross-linking agent | | |
| Zinc diacrylate (ZDA) | 30.5 | 35.5 |
| Free radical initiator | | |
| Dicumyl peroxide (Perkadox ® BC) | 1 | 0.35 |

TABLE 11-continued

Core Formulation for Dual Core

|  | Example 12 | |
| --- | --- | --- |
|  | Inner Core Composition (phr) | Outer Core Composition (phr) |
| Water releasing agent | | |
| Calcium sulfate dihydrate | 1 | 0 |
| Zinc sulfate heptahydrate | 1 | 0 |
| Aluminum sulfate hydrate | 1 | 0 |
| Soft and fast agent | | |
| Zinc pentachlorothiophenol (ZnPCTP) | 0.34 | 0.71 |
| Fillers | | |
| Zinc oxide (ZnO) | 5 | 14.8 |
| Regrind | 0 | 28 |
| Barium sulfate | 12.4 | 0 |

Table 12 below shows an exemplary core formulation for a dual core. As shown in Table 12, the water releasing agent, calcium sulfate dihydrate, is used in the core formulation for the inner core in an amount of 3 phr to form a positive hardness gradient in the inner core layer.

TABLE 12

Core Formulation for Dual Core

|  | Example 13 | |
| --- | --- | --- |
|  | Inner Core Composition (phr) | Outer Core Composition (phr) |
| Base Rubber | | |
| High cis-1,4 polybutadiene (Buna CB 1221) | 100 | 0 |
| Ethylene-propylene-diene rubber (Dow Nordel ® IP 5565 EPDM) | 0 | 0 |
| High cis-1,4 polybutadiene (BUDENE ® 1207) | 0 | 81 |
| Styrene butadiene rubber (SBR 1502) | 0 | 19 |
| Cross-linking agent | | |
| Zinc diacrylate (ZDA) | 30.5 | 35.5 |
| Free radical initiator | | |
| Dicumyl peroxide (Perkadox ® BC) | 1 | 0.35 |
| Water releasing agent | | |
| Calcium sulfate dihydrate | 3 | 0 |
| Soft and fast agent | | |
| Zinc pentachlorothiophenol (ZnPCTP) | 0.34 | 0.71 |
| Fillers | | |
| Zinc oxide (ZnO) | 5 | 14.8 |
| Regrind | 0 | 28 |
| Barium sulfate | 12.4 | 0 |

Examples 14-16: Properties of Cores and Resulting Golf Balls Formed Therefrom Cores The solid cores of Examples 14, 15, and 16 and the Comparative Example were formed using the core formulations shown in Table 13 below. The water releasing agent in each of the inventive core formulations results in a positive hardness gradient. The formulations were cured using conventional techniques known in the art.

TABLE 13

Core Formulations

|  | Example 14 Core Composition (phr) | Example 15 Core Composition (phr) | Example 16 Core Composition (phr) | Comparative Example Core Composition (phr) |
| --- | --- | --- | --- | --- |
| Base Rubber | | | | |
| High cis-1,4 polybutadiene (Buna CB 1221) | 100 | 80 | 80 | 100 |
| EPDM (Dow Nordel ® IP 5565 EPDM) | 0 | 5 | 5 | 0 |
| High cis-1,4 polybutadiene (BUDENE ® 1207) | 0 | 15 | 15 | 0 |
| Cross-linking agent | | | | |
| Zinc diacrylate (ZDA) | 30.5 | 32 | 34 | 31 |
| Free radical initiator | | | | |
| Dicumyl peroxide (Perkadox ® BC) | 1 | 0.6 | 0.6 | 0.5 |
| Water releasing agent | | | | |
| Calcium sulfate dihydrate | 3 | 3 | 3 | 0 |
| Soft and fast agent | | | | |
| Zinc pentachlorothiophenol (ZnPCTP) | 0.34 | 0.34 | 0.34 | 0.34 |
| Fillers | | | | |
| Zinc oxide (ZnO) | 5 | 5 | 5 | 5 |
| Regrind | 0 | 10 | 0 | 0 |
| Barium sulfate | 11.97 | 11.74 | 10.92 | to specific gravity |

The cores formed in the examples and the comparative example were evaluated for compression, surface hardness, center hardness, coefficient of restitution (COR), and hardness gradient, according to the test methods described below. The results are shown in Table 14.

TABLE 14

Physical Properties of Cores

|  | Dynamic Compression Measurement (DCM) | Surface Hardness (Shore C) | Center Hardness (Shore C) | COR | Hardness Gradient (Shore C) |
| --- | --- | --- | --- | --- | --- |
| Example 14 | 70.2 | 89.8 | 55.7 | 0.796 | 34.1 |
| Example 15 | 75.6 | 88.8 | 55.3 | 0.79 | 33.5 |
| Example 16 | 76.5 | 91 | 54.7 | 0.792 | 36.3 |
| Comparative Example | 72 | 81 | 66.5 | 0.789 | 14.5 |

As shown in Table 14, the cores formed with the exemplary formulations possessed increased hardness gradients compared to the core of the comparative example. Similarly, the cores formed with the exemplary formulations exhibited better COR and compression than the core of the comparative example.

Resulting Golf Balls

A cover having an inner cover layer and an outer cover layer was disposed over the manufactured cores of each of the examples and the comparative example, thereby forming golf balls having three layers. The golf balls were evaluated for spin rate and durability performance. The spin rate of each golf ball was measured after being struck with the following golf clubs: a driver at a ball speed of about 150 mph having an initial spin rate of 2900 rpm and at a launch angle of 11 degrees; a driver at a ball speed of about 182 mph having an initial spin rate of 2700 rpm and at a launch angle of 10 degrees; an 8-iron; a 5-iron; and a half wedge.

Figure 5:
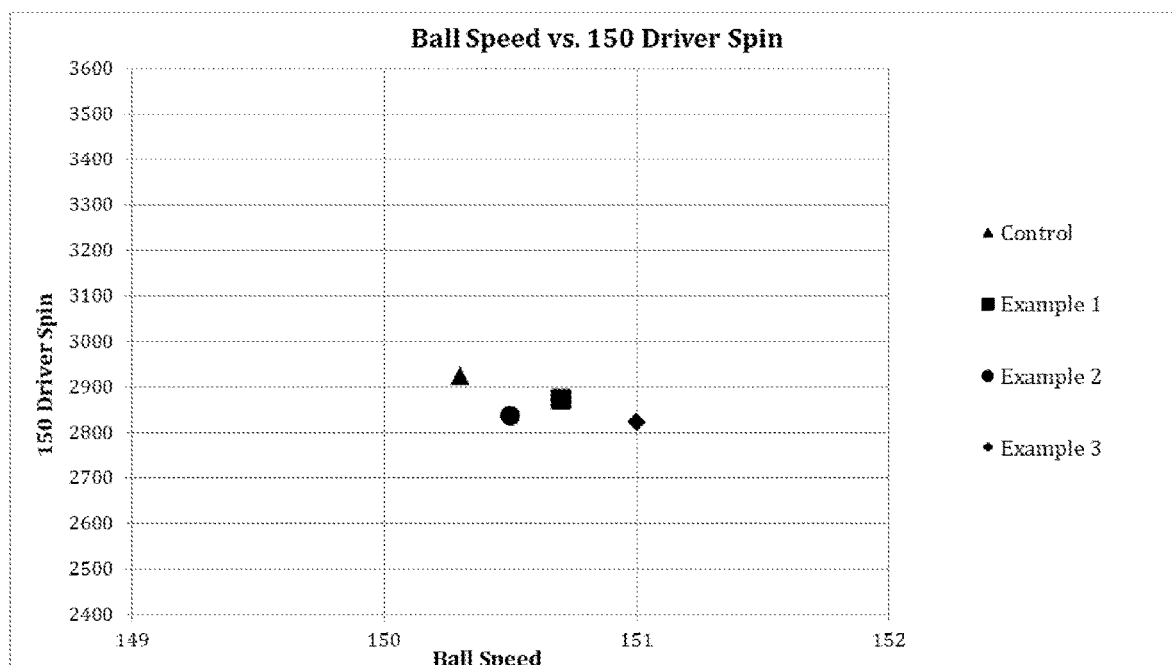
FIG. 5 is a graphical representation of measured spin rate and ball speed of exemplary and comparative golf balls after being struck by a driver at a first speed.
Figure 6:
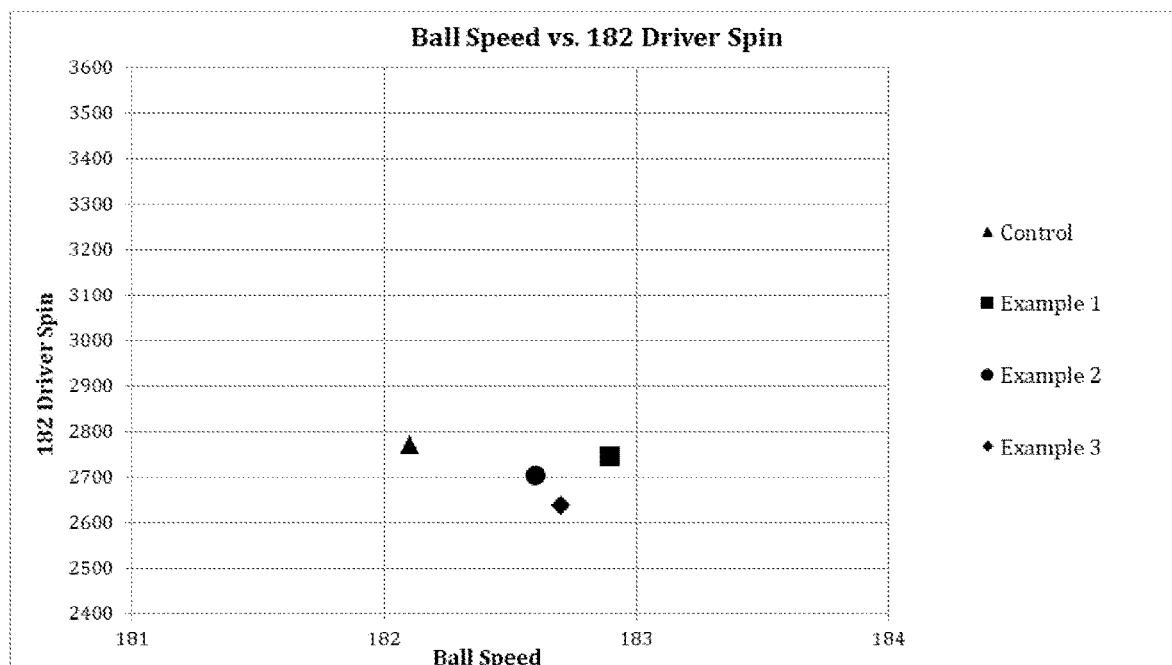
FIG. 6 is a graphical representation of measured spin rate and ball speed of exemplary and comparative golf balls after being struck by the driver at a second speed.
Figure 7:
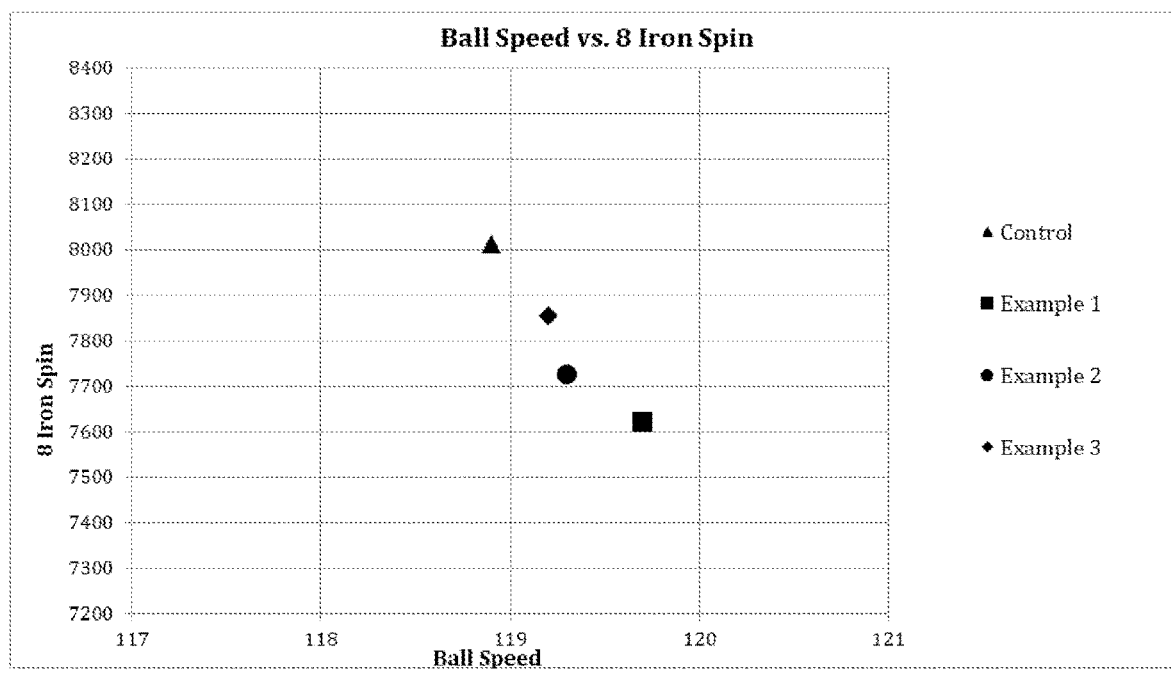
FIG. 7 is a graphical representation of measured spin rate and ball speed of exemplary and comparative golf balls after being struck by an 8-iron.
Figure 8:
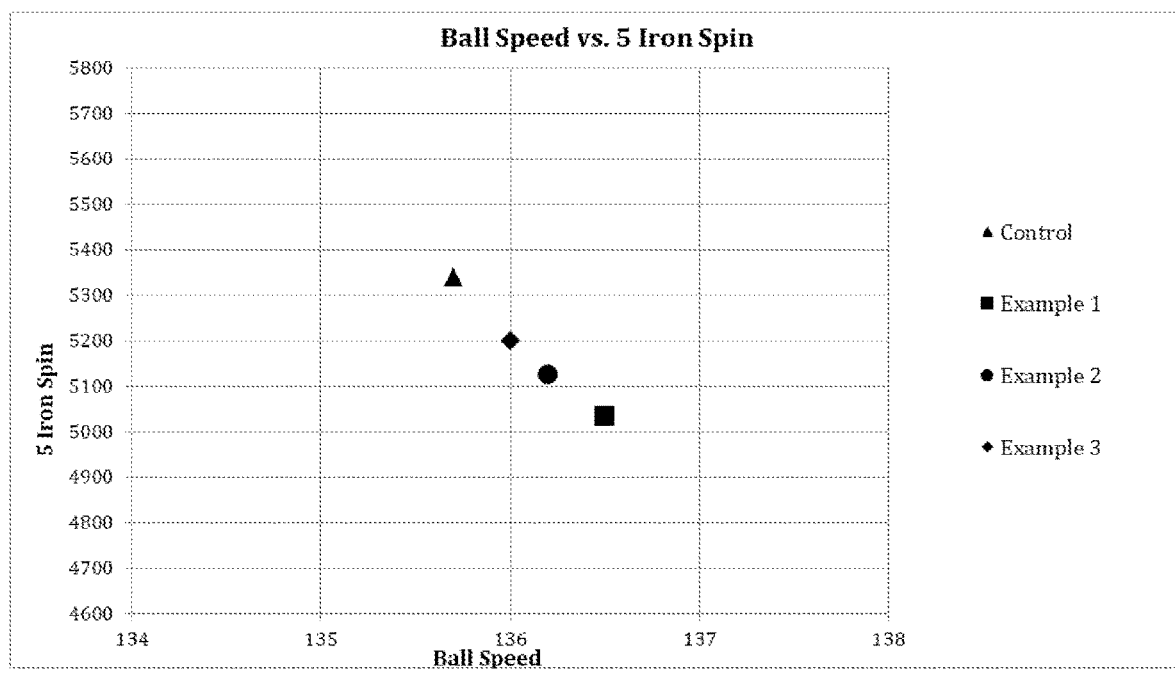
FIG. 8 is a graphical representation of measured spin rate and ball speed of exemplary and comparative golf balls after being struck by a 5-iron.
Figure 9:
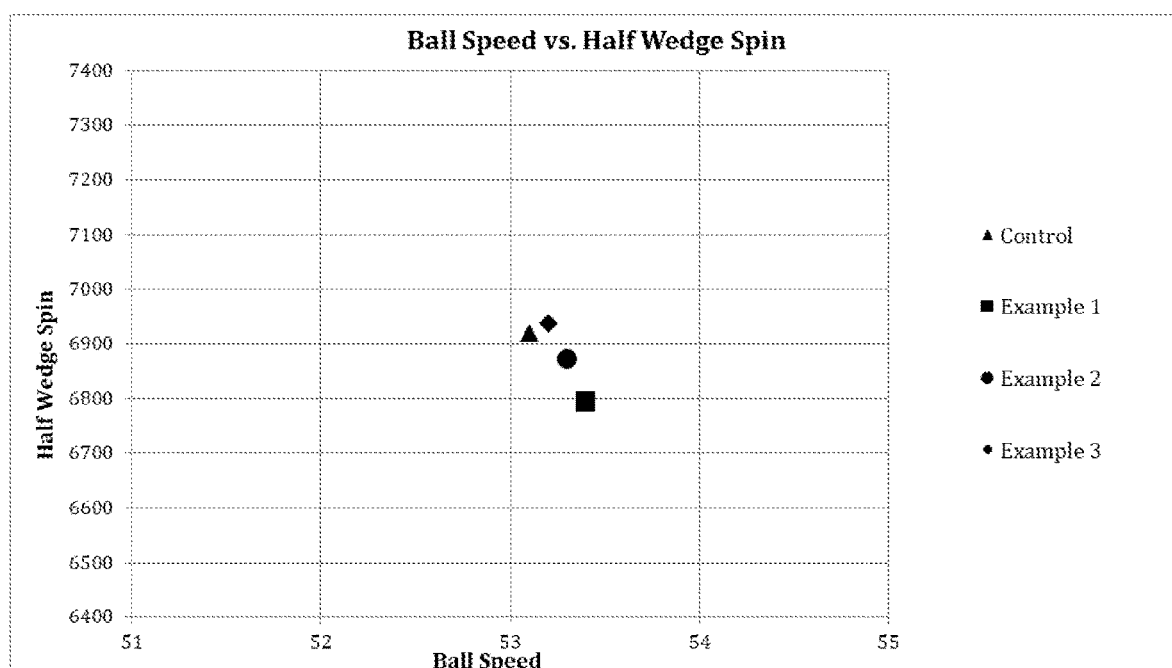
FIG. 9 is a graphical representation of measured spin rate and ball speed of exemplary and comparative golf balls after being struck by a half wedge.
Figure 10:
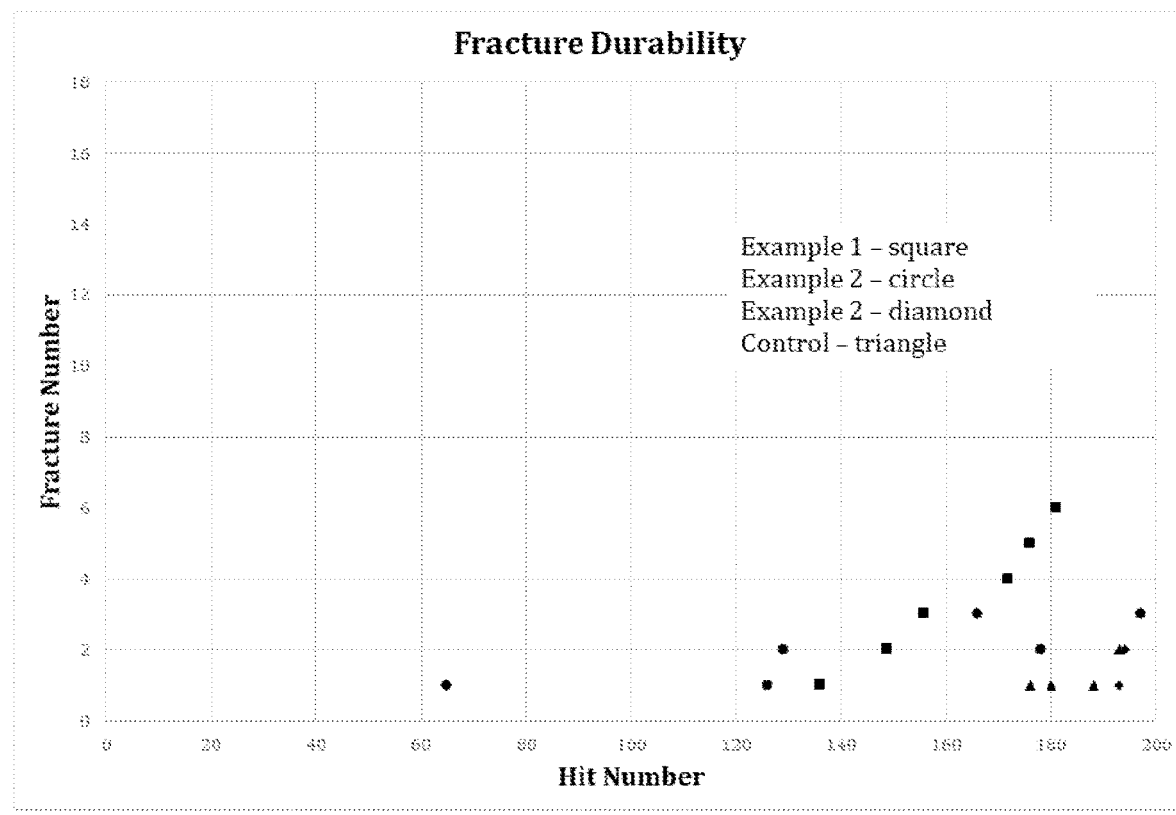
FIG. 10 is a graphical representation showing the number of fractures of each of the exemplary and comparative golf balls after a certain number of hits.

FIGS. 5-10 are graphs showing the results of the spin rate and durability performance testing. Specifically, FIG. 5 shows the measured spin rate and ball speed of each of the exemplary and comparative golf balls after being struck by the driver at a ball speed of about 150 mph. FIG. 6 shows the measured spin rate and ball speed of each of the exemplary and comparative golf balls after being struck by the driver at a ball speed of about 182 mph. FIG. 7 shows the measured spin rate and ball speed of each of the exemplary and comparative golf balls after being struck by an 8-iron. FIG. 8 shows the measured spin rate and ball speed of each of the exemplary and comparative golf balls after being struck by a 5-iron. FIG. 9 shows the measured spin rate and ball speed of each of the exemplary and comparative golf balls after being struck by a half wedge. FIG. 10 shows the number of fractures of each of the exemplary and comparative golf balls after a certain number of hits.

From the results shown in FIGS. 5-10, the golf balls having cores formed from the exemplary formulations, in which a water releasing agent was added to the core during curing, exhibited increased ball speed and a lower spin rate than the comparative golf ball, in which no water was added to the core. Similarly, as demonstrated in FIG. 6, the golf balls having cores formed from the exemplary formulations demonstrated increased durability over the comparative golf ball.

Test Methods
Hardness

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed "rough" surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked, and the hardness is measured at the center mark according to ASTM D-2240. Additional hardness measurements at any distance from the center of the core can then be made by drawing a line radially outward from the center mark and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present disclosure, when the hardness of the inner or outer surface of a core layer is needed after the inner layer has been surrounded with another core layer, the test procedure described above for measuring a point located 1 mm from an interface is used.

Compression

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present disclosure, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Coefficient of Restitution

The COR is determined according to a known procedure, where a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the golf balls in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention (s) set forth herein.

What is claimed is:

1. A golf ball, comprising:
  a core having an outer surface and a geometric center, wherein the core is formed from a rubber composition cured under heat, the rubber composition comprising:
    a base rubber,
    an organic peroxide,
    a cross-linking co-agent,
    a first water releasing agent and a second water releasing agent, wherein the first water releasing agent is aluminum sulfate monohydrate and the second water releasing agent is selected from calcium sulfate dihydrate or zinc sulfate heptahydrate,
  wherein the geometric center and the outer surface each has a hardness and the hardness of the geometric center ranges from about 45 Shore C to about 65 Shore C and the hardness of the outer surface ranges from about 80 Shore C to about 100 Shore C, and
  wherein the hardness of the outer surface is greater than the hardness of the geometric center to define a positive hardness gradient of at least 30 Shore C units; and
  a cover layer surrounding the core.

2. The golf ball of claim 1, wherein each of the first water releasing agent and the second water releasing agent is present in an amount of about 0.1 phr to about 3 phr.

3. The golf ball of claim 1, wherein the second water releasing agent is calcium sulfate dihydrate.

4. The golf ball of claim 1, wherein the second water releasing agent is zinc sulfate heptahydrate.

5. The golf ball of claim 1, wherein each of the first water releasing agent and the second water releasing agent is present in an amount of about 1 phr.

6. The golf ball of claim 1, wherein the organic peroxide comprises dimethyl terbutyl peroxide, dicumyl peroxide, or combinations thereof.

7. The golf ball of claim 1, wherein the cross-linking co-agent comprises a zinc salt of an acrylate, diacrylate, methacrylate, or dimethacrylate.

8. A golf ball, comprising:
  a dual core comprising an inner core layer and an outer core layer surrounding the inner core layer,
    wherein the outer core layer is formed from a first rubber composition cured under heat, the first rubber composition comprising:
      a base rubber,
      an organic peroxide,
      a cross-linking co-agent, and
      a first water releasing agent and a second water releasing agent, wherein the first water releasing agent is aluminum sulfate monohydrate and the second water releasing agent is selected from calcium sulfate dihydrate or zinc sulfate heptahydrate,
    wherein the outer core layer has an inner surface hardness less than an outer surface hardness to define a positive hardness gradient and the positive hardness gradient is at least 30 Shore C units,
    wherein the inner core layer is formed from a second rubber composition cured under heat, the second rubber composition comprising:
      a base rubber,
      an organic peroxide, and
      a cross-linking co-agent,
      wherein the inner core layer has a center hardness substantially the same as an outer surface hardness to define a zero hardness gradient, and
    a cover layer surrounding the dual core.

9. The golf ball of claim 8, wherein the positive hardness gradient is at least 34 Shore C units.

10. The golf ball of claim 8, wherein each of the first water releasing agent and the second water releasing agent is present in an amount of about 0.1 phr to about 3 phr.

11. The golf ball of claim 8, wherein at least one of the inner core layer or outer core layer is cured under infrared radiation.

12. The golf ball of claim 8, wherein the second water releasing agent is calcium sulfate dihydrate.

13. A golf ball, comprising:
  a multi-layered core comprising an inner core layer, an intermediate core layer surrounding the inner core layer, and an outer core layer surrounding the intermediate core layer, wherein the outer core layer is formed from a first rubber composition cured under heat and the intermediate core layer is formed from a second rubber composition cured under heat, the first rubber composition comprising:
- a base rubber,
- an organic peroxide,
- a cross-linking co-agent, and
- a first water releasing agent, a second water releasing agent, and a third water releasing agent, wherein the first water releasing agent is calcium sulfate dihydrate, the second water releasing agent is zinc sulfate heptahydrate, and the third water releasing agent is aluminum sulfate monohydrate,
- wherein the outer core layer formed from the first rubber composition has an inner surface hardness less than an outer surface hardness to define a positive hardness gradient and the positive hardness gradient is at least 30 Shore C units, and the second rubber composition comprising:
- a base rubber,
- an organic peroxide, and
- a cross-linking co-agent,
- wherein the intermediate core layer formed from the second rubber composition has an inner surface hardness substantially the same as an outer surface hardness to define a zero hardness gradient, and
- a cover layer surrounding the multi-layered core, wherein the cover layer comprises an ionomer, polyurethanes, polyureas, polyurethane-urea hybrids, or copolymers and blends thereof.

14. The golf ball of claim 13, wherein the positive hardness gradient is at least 34 Shore C units.

15. The golf ball of claim 13, wherein each of the first water releasing agent, the second water releasing agent, and the third water releasing agent is present in an amount of about 1 phr to about 3 phr.

16. The golf ball of claim 15, wherein the first water releasing agent, the second water releasing agent, and the third water releasing agent are present in equal amounts.

17. The golf ball of claim 13, wherein the inner core layer is formed from the second rubber composition.

* * * * *